United States Patent
Peter et al.

(10) Patent No.: US 11,919,363 B2
(45) Date of Patent: Mar. 5, 2024

(54) RECREATIONAL VEHICLE, COOLING DEVICE, CONTROLLING SYSTEM AND METHOD FOR CONTROLLING THE COOLING DEVICE

(71) Applicant: Dometic Sweden AB, Solna (SE)

(72) Inventors: Jörg Peter, Meinerzhagen (DE); Marcus Dietrich, Netphen (DE); Marcus Remmel, Roth (DE); Anton Lundqvist, Älvsjö (SE)

(73) Assignee: Dometic Sweden AB, Solna (SE)

( * ) Notice: Subject to any disclaimer, the term of this patent is extended or adjusted under 35 U.S.C. 154(b) by 75 days.

(21) Appl. No.: 17/673,080

(22) Filed: Feb. 16, 2022

(65) Prior Publication Data

US 2022/0169090 A1 Jun. 2, 2022

Related U.S. Application Data

(63) Continuation of application No. 16/641,581, filed as application No. PCT/EP2018/070390 on Jul. 27, 2018, now Pat. No. 11,254,183.

(30) Foreign Application Priority Data

Aug. 25, 2017 (DE) ...................... 10 2017 214 941.8

(51) Int. Cl.
*B60H 1/00* (2006.01)
(52) U.S. Cl.
CPC ..... *B60H 1/00364* (2013.01); *B60H 1/00771* (2013.01); *B60H 1/00964* (2013.01)
(58) Field of Classification Search
CPC ............ B60H 1/00364; B60H 1/00771; B60H 1/00964
See application file for complete search history.

(56) References Cited

U.S. PATENT DOCUMENTS

| 4,916,909 A | 4/1990 | Mathur et al. |
| 5,424,720 A | 6/1995 | Kirkpatrick |

(Continued)

FOREIGN PATENT DOCUMENTS

| AU | 2001280374 A1 | 5/2002 |
| AU | 2002335708 B2 | 4/2008 |

(Continued)

OTHER PUBLICATIONS

US D887,373 S, 06/2020, Becker (withdrawn)

(Continued)

*Primary Examiner* — Marc E Norman
(74) *Attorney, Agent, or Firm* — Dinsmore & Shohl LLP

(57) ABSTRACT

The present embodiments refer to a controlling system configured to be installed in a recreational vehicle, cooling devices comprising or coupled to such controlling systems, a recreational vehicle comprising such controlling systems and methods for controlling cooling the cooling devices. The controlling system comprises a central processing unit, a read out unit and a controlling unit and is configured to be coupled to a plurality of electronic devices of the recreational vehicle. The read out unit of the controlling system is configured to read out data from the electronic devices and/or sensors of the recreational vehicle coupled to the controlling system and to forward the read out data to the central processing unit. The central processing unit is configured to receive and to process the read out data received from the read out unit and to forward processed data to the controlling unit. The controlling unit is configured to receive the processed data from the central processing unit and to control at least one of the electronic devices based on at least some of the processed data.

20 Claims, 8 Drawing Sheets

(56) References Cited

U.S. PATENT DOCUMENTS

| | | |
|---|---|---|
| 5,632,614 A | 5/1997 | Consadori et al. |
| 5,931,151 A | 8/1999 | Van Dore et al. |
| 6,134,906 A | 10/2000 | Eastman |
| 6,460,356 B1 | 10/2002 | Tao et al. |
| 6,729,144 B1 | 5/2004 | Kupferman |
| 6,856,820 B1 | 2/2005 | Kolls |
| 6,863,222 B2 | 3/2005 | Slifkin et al. |
| 6,929,061 B2 | 8/2005 | Lajeunesse |
| 7,082,380 B2 | 7/2006 | Wiebe et al. |
| 7,117,051 B2 | 10/2006 | Landry et al. |
| 7,131,282 B2 | 11/2006 | Karlsson et al. |
| 7,412,837 B2 | 8/2008 | Karisson et al. |
| 7,448,546 B2 | 11/2008 | Jung et al. |
| D588,479 S | 3/2009 | Giese |
| D604,305 S | 11/2009 | Anzures et al. |
| 7,707,845 B2 | 5/2010 | Bilodeau |
| 8,307,667 B2 | 11/2012 | Rusignuolo et al. |
| 8,374,824 B2 | 2/2013 | Schwiers et al. |
| 8,461,958 B2 | 6/2013 | Saenz et al. |
| 8,539,783 B1 | 9/2013 | Bunch |
| 8,545,113 B2 | 10/2013 | Johnson et al. |
| 8,549,131 B2 | 10/2013 | Keyghobad et al. |
| 8,653,949 B2 | 2/2014 | Lee et al. |
| 8,960,563 B1 | 2/2015 | Perten et al. |
| 8,981,930 B2 | 3/2015 | Horstemeyer et al. |
| D738,355 S | 9/2015 | Smith et al. |
| 9,193,312 B2 | 11/2015 | Colella et al. |
| D756,333 S | 5/2016 | Smith et al. |
| D757,691 S | 5/2016 | Smith et al. |
| D761,232 S | 7/2016 | Smith et al. |
| D766,217 S | 9/2016 | Smith et al. |
| 9,454,897 B2 | 9/2016 | Cattermole et al. |
| D823,265 S | 7/2018 | Meda et al. |
| D839,318 S | 1/2019 | Meda et al. |
| D846,505 S | 4/2019 | Becker |
| D865,914 S | 11/2019 | Snyder |
| 10,696,129 B2 | 6/2020 | Bergin |
| D893,436 S | 8/2020 | Becker |
| 10,747,404 B2 | 8/2020 | Liddell et al. |
| 10,941,955 B2 | 3/2021 | Heral |
| 11,254,183 B2 | 2/2022 | Peter |
| 2003/0164754 A1 | 9/2003 | Roseen |
| 2004/0178889 A1 | 9/2004 | Buckingham et al. |
| 2005/0141154 A1 | 6/2005 | Consadori et al. |
| 2006/0123807 A1 | 6/2006 | Sullivan et al. |
| 2007/0023180 A1 | 2/2007 | Komarek et al. |
| 2007/0028635 A1 | 2/2007 | Gleeson |
| 2008/0087663 A1 | 4/2008 | Mansbery et al. |
| 2008/0115513 A1 | 5/2008 | Unmack |
| 2008/0121729 A1 | 5/2008 | Gray |
| 2008/0299961 A1 | 12/2008 | Muller et al. |
| 2009/0109004 A1 | 4/2009 | Van Alstyne |
| 2009/0139246 A1 | 6/2009 | Lifson et al. |
| 2010/0274604 A1 | 10/2010 | Crilly |
| 2012/0255317 A1 | 10/2012 | Leistner et al. |
| 2014/0148975 A1 | 5/2014 | Self |
| 2014/0210593 A1 | 7/2014 | Cattermole et al. |
| 2014/0313055 A1 | 10/2014 | Warkentin et al. |
| 2015/0184442 A1 | 7/2015 | Gantman et al. |
| 2015/0198937 A1 | 7/2015 | Wait |
| 2016/0144764 A1 | 5/2016 | Dutta |
| 2016/0211985 A1 | 7/2016 | Castillo et al. |
| 2016/0214621 A1 | 7/2016 | Baalu et al. |
| 2017/0264224 A1 | 9/2017 | Becker |
| 2017/0285712 A1 | 10/2017 | Veloso et al. |
| 2017/0372600 A1 | 12/2017 | Palin et al. |
| 2018/0134116 A1 | 5/2018 | Chen |
| 2018/0147913 A1 | 5/2018 | Bergin |
| 2018/0191687 A1 | 7/2018 | Munafo |
| 2019/0003765 A1 | 1/2019 | Chen |
| 2019/0128551 A1 | 5/2019 | Heral |
| 2020/0313871 A1 | 10/2020 | Troia et al. |
| 2020/0338951 A1* | 10/2020 | Paci ............... B60R 16/03 |
| 2021/0142601 A1 | 5/2021 | Schoenfelder et al. |
| 2021/0229529 A1* | 7/2021 | Cai ............... F25B 49/022 |

FOREIGN PATENT DOCUMENTS

| | | |
|---|---|---|
| AU | 2006259965 B2 | 6/2009 |
| AU | 201710975 S | 3/2017 |
| AU | 201710976 S | 3/2017 |
| AU | 201712767 S | 5/2017 |
| AU | 201811509 S | 4/2018 |
| AU | 201811512 S | 4/2018 |
| AU | 2017364256 | 6/2019 |
| CA | 2572005 A1 | 8/2007 |
| CA | 2948710 A1 | 9/2017 |
| CA | 174706 S | 5/2018 |
| CA | 179312 S | 5/2018 |
| CN | 2420532 Y | 2/2001 |
| CN | 1299034 A | 6/2001 |
| CN | 2434623 Y | 6/2001 |
| CN | 2524157 Y | 12/2002 |
| CN | 1116579 C | 7/2003 |
| CN | 1475763 A | 2/2004 |
| CN | 1178037 C | 12/2004 |
| CN | 1570929 A | 1/2005 |
| CN | 1761318 A | 4/2006 |
| CN | 1763450 A | 4/2006 |
| CN | 2769742 Y | 4/2006 |
| CN | 2780132 Y | 5/2006 |
| CN | 2811877 Y | 8/2006 |
| CN | 1828186 A | 9/2006 |
| CN | 2829654 Y | 10/2006 |
| CN | 2849539 Y | 12/2006 |
| CN | 1888750 A | 1/2007 |
| CN | 1936533 A | 3/2007 |
| CN | 2878997 Y | 3/2007 |
| CN | 2906406 Y | 5/2007 |
| CN | 101063586 A | 10/2007 |
| CN | 200961918 Y | 10/2007 |
| CN | 101074816 A | 11/2007 |
| CN | 201000370 Y | 1/2008 |
| CN | 201015999 Y | 2/2008 |
| CN | 201028884 Y | 2/2008 |
| CN | 100373116 C | 3/2008 |
| CN | 100380075 C | 4/2008 |
| CN | 101153758 A | 4/2008 |
| CN | 201066217 Y | 5/2008 |
| CN | 100397004 C | 6/2008 |
| CN | 100398956 C | 7/2008 |
| CN | 101245936 A | 8/2008 |
| CN | 101245957 A | 8/2008 |
| CN | 100417880 C | 9/2008 |
| CN | 101266069 A | 9/2008 |
| CN | 201129824 Y | 10/2008 |
| CN | 201129825 Y | 10/2008 |
| CN | 201149349 Y | 11/2008 |
| CN | 201163244 Y | 12/2008 |
| CN | 201166753 Y | 12/2008 |
| CN | 201170678 Y | 12/2008 |
| CN | 101368771 A | 2/2009 |
| CN | 201191043 Y | 2/2009 |
| CN | 201196458 Y | 2/2009 |
| CN | 201209986 Y | 3/2009 |
| CN | 201230319 Y | 4/2009 |
| CN | 101435604 A | 5/2009 |
| CN | 201233076 Y | 5/2009 |
| CN | 201237396 Y | 5/2009 |
| CN | 101476563 A | 7/2009 |
| CN | 101498933 A | 8/2009 |
| CN | 201297694 Y | 8/2009 |
| CN | 201306900 Y | 9/2009 |
| CN | 201348340 Y | 11/2009 |
| CN | 201348413 Y | 11/2009 |
| CN | 100575078 C | 12/2009 |
| CN | 201363279 Y | 12/2009 |
| CN | 201363838 Y | 12/2009 |
| CN | 201363859 Y | 12/2009 |
| CN | 201363949 Y | 12/2009 |
| CN | 101665037 A | 3/2010 |
| CN | 101691863 A | 4/2010 |
| CN | 201486856 U | 5/2010 |
| CN | 201503133 U | 6/2010 |
| CN | 201539404 U | 8/2010 |

(56) References Cited

FOREIGN PATENT DOCUMENTS

| | | |
|---|---|---|
| CN | 201541754 U | 8/2010 |
| CN | 201546958 U | 8/2010 |
| CN | 201575541 U | 9/2010 |
| CN | 201589475 U | 9/2010 |
| CN | 1928445 B | 10/2010 |
| CN | 101251290 B | 10/2010 |
| CN | 101866173 A | 10/2010 |
| CN | 101363640 B | 11/2010 |
| CN | 201621800 U | 11/2010 |
| CN | 201622078 U | 11/2010 |
| CN | 201666251 U | 12/2010 |
| CN | 201672642 U | 12/2010 |
| CN | 201748559 U | 2/2011 |
| CN | 201749468 U | 2/2011 |
| CN | 101435616 B | 4/2011 |
| CN | 101464032 B | 4/2011 |
| CN | 102012146 A | 4/2011 |
| CN | 201820291 U | 5/2011 |
| CN | 101619882 B | 6/2011 |
| CN | 201849367 U | 6/2011 |
| CN | 201852224 U | 6/2011 |
| CN | 102118435 A | 7/2011 |
| CN | 201908838 U | 7/2011 |
| CN | 101586562 B | 8/2011 |
| CN | 102147125 A | 8/2011 |
| CN | 102151092 A | 8/2011 |
| CN | 102156466 A | 8/2011 |
| CN | 201923534 U | 8/2011 |
| CN | 201948819 U | 8/2011 |
| CN | 101435617 B | 9/2011 |
| CN | 102192569 A | 9/2011 |
| CN | 201964703 U | 9/2011 |
| CN | 201976127 U | 9/2011 |
| CN | 201982375 U | 9/2011 |
| CN | 102213518 A | 10/2011 |
| CN | 102235717 A | 11/2011 |
| CN | 102252369 A | 11/2011 |
| CN | 202050251 U | 11/2011 |
| CN | 202083072 U | 12/2011 |
| CN | 102338428 A | 2/2012 |
| CN | 102345951 A | 2/2012 |
| CN | 102355628 A | 2/2012 |
| CN | 102364319 A | 2/2012 |
| CN | 202177186 U | 3/2012 |
| CN | 101556069 B | 4/2012 |
| CN | 202186048 U | 4/2012 |
| CN | 101443719 B | 5/2012 |
| CN | 102444957 A | 5/2012 |
| CN | 102466296 A | 5/2012 |
| CN | 102478335 A | 5/2012 |
| CN | 101275800 B | 6/2012 |
| CN | 101788172 B | 7/2012 |
| CN | 101825087 B | 7/2012 |
| CN | 101846381 B | 7/2012 |
| CN | 101886852 B | 7/2012 |
| CN | 102042724 B | 7/2012 |
| CN | 102536819 A | 7/2012 |
| CN | 102564052 A | 7/2012 |
| CN | 102588285 A | 7/2012 |
| CN | 202287095 U | 7/2012 |
| CN | 202305190 U | 7/2012 |
| CN | 102032643 B | 8/2012 |
| CN | 102620517 A | 8/2012 |
| CN | 102650479 A | 8/2012 |
| CN | 101988839 B | 9/2012 |
| CN | 102679490 A | 9/2012 |
| CN | 102691660 A | 9/2012 |
| CN | 202431521 U | 9/2012 |
| CN | 202431522 U | 9/2012 |
| CN | 202442411 U | 9/2012 |
| CN | 202452784 U | 9/2012 |
| CN | 102705237 A | 10/2012 |
| CN | 202470336 U | 10/2012 |
| CN | 202475495 U | 10/2012 |
| CN | 202476017 U | 10/2012 |
| CN | 202501706 U | 10/2012 |
| CN | 202503538 U | 10/2012 |
| CN | 202511560 U | 10/2012 |
| CN | 101988717 B | 11/2012 |
| CN | 102765563 B | 11/2012 |
| CN | 202532335 U | 11/2012 |
| CN | 202563323 U | 11/2012 |
| CN | 102809202 B | 12/2012 |
| CN | 102840716 A | 12/2012 |
| CN | 202568984 U | 12/2012 |
| CN | 202581676 U | 12/2012 |
| CN | 202598971 U | 12/2012 |
| CN | 202613597 U | 12/2012 |
| CN | 202613835 U | 12/2012 |
| CN | 202630282 U | 12/2012 |
| CN | 102853624 A | 1/2013 |
| CN | 102878663 A | 1/2013 |
| CN | 102889748 A | 1/2013 |
| CN | 202648236 U | 1/2013 |
| CN | 202692596 U | 1/2013 |
| CN | 202708102 U | 1/2013 |
| CN | 202709553 U | 1/2013 |
| CN | 102914102 A | 2/2013 |
| CN | 202734071 U | 2/2013 |
| CN | 202734420 U | 2/2013 |
| CN | 202789544 U | 3/2013 |
| CN | 202835631 U | 3/2013 |
| CN | 102116515 B | 4/2013 |
| CN | 103032933 A | 4/2013 |
| CN | 202851355 U | 4/2013 |
| CN | 202868893 U | 4/2013 |
| CN | 202868894 U | 4/2013 |
| CN | 202868919 U | 4/2013 |
| CN | 202868920 U | 4/2013 |
| CN | 103105204 A | 5/2013 |
| CN | 202916629 U | 5/2013 |
| CN | 203771639 U | 5/2013 |
| CN | 103162469 A | 6/2013 |
| CN | 103177339 A | 6/2013 |
| CN | 202967270 U | 6/2013 |
| CN | 202993659 U | 6/2013 |
| CN | 202993694 U | 6/2013 |
| CN | 103188655 A | 7/2013 |
| CN | 103196274 A | 7/2013 |
| CN | 203053481 U | 7/2013 |
| CN | 203068889 U | 7/2013 |
| CN | 103245007 A | 8/2013 |
| CN | 103245031 A | 8/2013 |
| CN | 103245033 A | 8/2013 |
| CN | 203116393 U | 8/2013 |
| CN | 203163367 U | 8/2013 |
| CN | 203164715 U | 8/2013 |
| CN | 103292572 A | 9/2013 |
| CN | 103322766 A | 9/2013 |
| CN | 203203288 U | 9/2013 |
| CN | 203203289 U | 9/2013 |
| CN | 203203317 U | 9/2013 |
| CN | 103335485 A | 10/2013 |
| CN | 103375870 A | 10/2013 |
| CN | 103375871 A | 10/2013 |
| CN | 103375935 A | 10/2013 |
| CN | 203310199 U | 11/2013 |
| CN | 103471297 A | 12/2013 |
| CN | 203324857 U | 12/2013 |
| CN | 203366082 U | 12/2013 |
| CN | 103512087 A | 1/2014 |
| CN | 103528142 A | 1/2014 |
| CN | 103574771 A | 2/2014 |
| CN | 103574772 A | 2/2014 |
| CN | 103578257 A | 2/2014 |
| CN | 103604272 A | 2/2014 |
| CN | 103616863 A | 3/2014 |
| CN | 103629740 A | 3/2014 |
| CN | 103629866 A | 3/2014 |
| CN | 103671119 A | 3/2014 |
| CN | 203489530 U | 3/2014 |
| CN | 103691835 A | 4/2014 |
| CN | 103745359 A | 4/2014 |
| CN | 203518373 U | 4/2014 |

(56) References Cited

FOREIGN PATENT DOCUMENTS

| | | |
|---|---|---|
| CN | 203550232 U | 4/2014 |
| CN | 203550407 U | 4/2014 |
| CN | 203561118 U | 4/2014 |
| CN | 203566105 U | 4/2014 |
| CN | 102705939 B | 5/2014 |
| CN | 103776090 A | 5/2014 |
| CN | 103776212 A | 5/2014 |
| CN | 103791684 A | 5/2014 |
| CN | 103807987 A | 5/2014 |
| CN | 103808012 A | 5/2014 |
| CN | 203586483 U | 5/2014 |
| CN | 203586488 U | 5/2014 |
| CN | 103836761 A | 6/2014 |
| CN | 103854344 A | 6/2014 |
| CN | 103884152 A | 6/2014 |
| CN | 203633039 U | 6/2014 |
| CN | 203664542 U | 6/2014 |
| CN | 103906529 A | 7/2014 |
| CN | 103925677 A | 7/2014 |
| CN | 103925678 A | 7/2014 |
| CN | 103925682 A | 7/2014 |
| CN | 103925753 A | 7/2014 |
| CN | 103925755 A | 7/2014 |
| CN | 103940053 A | 7/2014 |
| CN | 103940139 A | 7/2014 |
| CN | 103940157 A | 7/2014 |
| CN | 103954082 A | 7/2014 |
| CN | 103954087 A | 7/2014 |
| CN | 203706293 U | 7/2014 |
| CN | 203719239 U | 7/2014 |
| CN | 103968620 A | 8/2014 |
| CN | 103968631 A | 8/2014 |
| CN | 103968636 A | 8/2014 |
| CN | 103968963 A | 8/2014 |
| CN | 104006445 A | 8/2014 |
| CN | 104006597 A | 8/2014 |
| CN | 203796564 U | 8/2014 |
| CN | 104033996 A | 9/2014 |
| CN | 104048406 A | 9/2014 |
| CN | 104048448 A | 9/2014 |
| CN | 104050784 A | 9/2014 |
| CN | 203833232 U | 9/2014 |
| CN | 203837349 U | 9/2014 |
| CN | 203837396 U | 9/2014 |
| CN | 104089378 A | 10/2014 |
| CN | 104101124 A | 10/2014 |
| CN | 104101125 A | 10/2014 |
| CN | 104110740 A | 10/2014 |
| CN | 104121174 A | 10/2014 |
| CN | 104122463 A | 10/2014 |
| CN | 203867902 U | 10/2014 |
| CN | 203908094 U | 10/2014 |
| CN | 203908147 U | 10/2014 |
| CN | 203908786 U | 10/2014 |
| CN | 102958751 B | 11/2014 |
| CN | 104134292 A | 11/2014 |
| CN | 104139226 A | 11/2014 |
| CN | 104142001 A | 11/2014 |
| CN | 104154802 A | 11/2014 |
| CN | 104155964 A | 11/2014 |
| CN | 104165443 A | 11/2014 |
| CN | 104165483 A | 11/2014 |
| CN | 203928142 U | 11/2014 |
| CN | 203964436 U | 11/2014 |
| CN | 203964468 U | 11/2014 |
| CN | 203965900 U | 11/2014 |
| CN | 104180442 A | 12/2014 |
| CN | 104197632 A | 12/2014 |
| CN | 104199358 A | 12/2014 |
| CN | 104214887 A | 12/2014 |
| CN | 104215007 A | 12/2014 |
| CN | 104219289 A | 12/2014 |
| CN | 104236023 A | 12/2014 |
| CN | 104236198 A | 12/2014 |
| CN | 104236244 A | 12/2014 |
| CN | 104251591 A | 12/2014 |
| CN | 204006509 U | 12/2014 |
| CN | 204029050 U | 12/2014 |
| CN | 204044653 U | 12/2014 |
| CN | 204055526 U | 12/2014 |
| CN | 204063308 U | 12/2014 |
| CN | 204063678 U | 12/2014 |
| CN | 104266318 A | 1/2015 |
| CN | 104266423 A | 1/2015 |
| CN | 104279150 A | 1/2015 |
| CN | 104279716 A | 1/2015 |
| CN | 104279836 A | 1/2015 |
| CN | 104289021 A | 1/2015 |
| CN | 104296348 A | 1/2015 |
| CN | 104296489 A | 1/2015 |
| CN | 104315671 A | 1/2015 |
| CN | 204100662 U | 1/2015 |
| CN | 204115391 U | 1/2015 |
| CN | 104329831 A | 2/2015 |
| CN | 104344595 A | 2/2015 |
| CN | 104374044 A | 2/2015 |
| CN | 104374055 A | 2/2015 |
| CN | 104374117 A | 2/2015 |
| CN | 104374159 A | 2/2015 |
| CN | 104374161 A | 2/2015 |
| CN | 104374162 A | 2/2015 |
| CN | 204141931 U | 2/2015 |
| CN | 204143491 U | 2/2015 |
| CN | 204177417 U | 2/2015 |
| CN | 204178470 U | 2/2015 |
| CN | 104406271 A | 3/2015 |
| CN | 104422065 A | 3/2015 |
| CN | 104422198 A | 3/2015 |
| CN | 104422217 A | 3/2015 |
| CN | 104456846 A | 3/2015 |
| CN | 104457048 A | 3/2015 |
| CN | 104457072 A | 3/2015 |
| CN | 104457130 A | 3/2015 |
| CN | 104457132 A | 3/2015 |
| CN | 104467148 A | 3/2015 |
| CN | 204187779 U | 3/2015 |
| CN | 204202120 U | 3/2015 |
| CN | 104482712 A | 4/2015 |
| CN | 104501483 A | 4/2015 |
| CN | 104503309 A | 4/2015 |
| CN | 104515245 A | 4/2015 |
| CN | 104534618 A | 4/2015 |
| CN | 204270404 U | 4/2015 |
| CN | 204291654 U | 4/2015 |
| CN | 110568987 A | 12/2019 |
| DE | 10161576 A1 | 6/2003 |
| DE | 202006010816 | 3/2007 |
| DE | 202006020319 U1 | 7/2008 |
| DE | 102017214941 A1 | 2/2019 |
| DE | 112017005541 T5 | 8/2019 |
| DE | 112018005002 T5 | 7/2020 |
| EP | 0881443 A1 | 12/1998 |
| EP | 1378981 A3 | 1/2004 |
| EP | 1226394 B1 | 9/2007 |
| EP | 1879367 A1 | 1/2008 |
| EP | 2056534 A1 | 5/2009 |
| EP | 1478531 B2 | 4/2011 |
| EP | 2733576 A1 | 5/2014 |
| EP | 2769275 A4 | 4/2016 |
| EP | 2903859 B1 | 12/2017 |
| EP | 2462395 B1 | 1/2018 |
| EP | 3971661 A1 | 3/2022 |
| EP | 3971691 A1 | 3/2022 |
| EP | 3972314 A1 | 3/2022 |
| GB | 2399887 A | 9/2004 |
| IN | 200808536 P1 | 5/2009 |
| JP | 2000357146 A | 12/2000 |
| JP | 2001183043 A | 7/2001 |
| JP | 2001208463 A | 8/2001 |
| JP | 2002092120 A | 3/2002 |
| JP | 2002092307 A | 3/2002 |
| JP | 2002162146 A | 6/2002 |
| JP | 2002228154 A | 8/2002 |
| JP | 2002236798 A | 8/2002 |

(56) References Cited

FOREIGN PATENT DOCUMENTS

| | | |
|---|---|---|
| JP | 2002295936 A | 10/2002 |
| JP | 2002295939 A | 10/2002 |
| JP | 2002295960 A | 10/2002 |
| JP | 2002295961 A | 10/2002 |
| JP | 2002342564 A | 11/2002 |
| JP | 2003022364 A | 1/2003 |
| JP | 2003090673 A | 3/2003 |
| JP | 2003162243 A | 6/2003 |
| JP | 2003207260 A | 7/2003 |
| JP | 2003242343 A | 8/2003 |
| JP | 2004005027 A | 1/2004 |
| JP | 2004086684 A | 3/2004 |
| JP | 2004259145 A | 9/2004 |
| JP | 2005098560 A | 4/2005 |
| JP | 2005101846 A | 4/2005 |
| JP | 2005164054 A | 6/2005 |
| JP | 2005284611 A | 10/2005 |
| JP | 2005293382 A | 10/2005 |
| JP | 2005311864 A | 11/2005 |
| JP | 2006011930 A | 1/2006 |
| JP | 2006250510 A | 9/2006 |
| JP | 2007046833 A | 2/2007 |
| JP | 2013238345 A | 11/2013 |
| JP | 2014209053 A | 11/2014 |
| KR | 20000030798 A | 6/2000 |
| KR | 20000071913 A | 12/2000 |
| KR | 20010077246 A | 8/2001 |
| KR | 20010077303 A | 8/2001 |
| KR | 20010094360 A | 11/2001 |
| KR | 20010094428 A | 11/2001 |
| KR | 20010105113 A | 11/2001 |
| KR | 20020004925 A | 1/2002 |
| KR | 20020009140 A | 2/2002 |
| KR | 20020009141 A | 2/2002 |
| KR | 20020013125 A | 2/2002 |
| KR | 20020027722 A | 4/2002 |
| KR | 20020055514 A | 7/2002 |
| KR | 100373092 B1 | 2/2003 |
| KR | 100373093 B1 | 2/2003 |
| KR | 20030016739 A | 3/2003 |
| KR | 100379416 B1 | 4/2003 |
| KR | 100381168 B1 | 4/2003 |
| KR | 20030075692 A | 9/2003 |
| KR | 100400464 B1 | 10/2003 |
| KR | 100403021 B1 | 10/2003 |
| KR | 20040021305 A | 3/2004 |
| KR | 20040029884 A | 4/2004 |
| KR | 20040032649 A | 4/2004 |
| KR | 100429617 B1 | 5/2004 |
| KR | 100432721 B1 | 5/2004 |
| KR | 100437057 B1 | 6/2004 |
| KR | 100457558 B1 | 11/2004 |
| KR | 100457559 B1 | 11/2004 |
| KR | 100471448 B1 | 3/2005 |
| KR | 100476448 B1 | 3/2005 |
| KR | 100484814 B1 | 4/2005 |
| KR | 100487763 B1 | 5/2005 |
| KR | 20050054716 A | 6/2005 |
| KR | 20050058799 A | 6/2005 |
| KR | 20050059883 A | 6/2005 |
| KR | 20050077657 A | 8/2005 |
| KR | 20050078301 A | 8/2005 |
| KR | 20050110147 A | 11/2005 |
| KR | 100535675 B1 | 12/2005 |
| KR | 100565482 B1 | 3/2006 |
| KR | 100593641 B1 | 6/2006 |
| KR | 100600741 B1 | 7/2006 |
| KR | 20060089854 A | 8/2006 |
| KR | 20060117703 A | 11/2006 |
| KR | 20060119580 A | 11/2006 |
| KR | 20060120799 A | 11/2006 |
| KR | 100656394 B1 | 12/2006 |
| KR | 100656400 B1 | 12/2006 |
| KR | 100657926 B1 | 12/2006 |
| KR | 100657927 B1 | 12/2006 |
| KR | 100673435 B1 | 1/2007 |
| KR | 20070012991 A | 1/2007 |
| KR | 100676764 B1 | 2/2007 |
| KR | 20070027180 A | 3/2007 |
| KR | 20070053510 A | 5/2007 |
| KR | 20070074863 A | 7/2007 |
| KR | 100745804 B1 | 8/2007 |
| KR | 20080029408 A | 4/2008 |
| KR | 20080037129 A | 4/2008 |
| KR | 100832492 B1 | 5/2008 |
| KR | 20080060910 A | 7/2008 |
| KR | 20080076381 A | 8/2008 |
| KR | 20090045596 A | 5/2009 |
| KR | 20090047724 A | 5/2009 |
| KR | 100934001 B1 | 12/2009 |
| KR | 100950734 B1 | 3/2010 |
| KR | 100975938 B1 | 8/2010 |
| KR | 100982260 B1 | 9/2010 |
| KR | 101028075 B1 | 4/2011 |
| KR | 101028502 B1 | 4/2011 |
| KR | 101031844 B1 | 5/2011 |
| KR | 20110050764 A | 5/2011 |
| KR | 20110067824 A | 6/2011 |
| KR | 20110124082 A | 11/2011 |
| KR | 20130094047 A | 8/2013 |
| KR | 20140000081 A | 1/2014 |
| KR | 20140026975 A | 3/2014 |
| KR | 20150051514 A | 5/2015 |
| KR | 20150052690 A | 5/2015 |
| TW | 200301047 A | 6/2003 |
| TW | 593950 B | 6/2004 |
| TW | 201309059 A | 2/2013 |
| WO | 03072378 | 5/2004 |
| WO | 2007117245 | 10/2007 |
| WO | 2010008343 | 1/2010 |
| WO | 2012122390 A2 | 9/2012 |
| WO | 2013189183 A1 | 12/2013 |
| WO | 2014014862 A2 | 1/2014 |
| WO | 2014016212 A1 | 1/2014 |
| WO | 2014106060 A1 | 7/2014 |
| WO | 2014183437 A1 | 11/2014 |
| WO | 2014205243 A1 | 12/2014 |
| WO | 2015058421 A1 | 4/2015 |
| WO | 2016000041 A1 | 1/2016 |
| WO | 2018082168 A1 | 5/2018 |
| WO | 2018096127 A1 | 5/2018 |
| WO | 2019038023 A1 | 2/2019 |
| WO | 2019082168 A1 | 5/2019 |
| WO | 2020183367 A1 | 9/2020 |
| WO | 2020183368 A1 | 9/2020 |
| WO | 2022058389 A1 | 3/2022 |
| WO | 2022058390 A1 | 3/2022 |
| WO | 2022058391 A1 | 3/2022 |

OTHER PUBLICATIONS

U.S. Appl. No. 16/641,581 entitled "Recreational Vehicle, Cooling Device, Controlling System and Method for Controlling the Cooling Device" filed Feb. 24, 2020.
Design U.S. Appl. No. 29/641,674, filed Mar. 23, 2018 titled "Control Panel".
Design U.S. Appl. No. 29/767,088, filed Jan. 20, 2021 titled "Control Panel".
Design U.S. Appl. No. 29/683,099, filed Mar. 11, 2019 titled Controller.
European Design Application No. 008053383-0001-0003 filed on Jul. 24, 2020.
Notice of Allowance for U.S. Appl. No. 16/172,253 dated Oct. 26, 2020.
Utility U.S. Appl. No. 16/172,253 entitled "Systems, Methods, and Apparatuses for Providing Communications Between Climate Control Devices in a Recreational Vehicle" filed Oct. 26, 2018.
Non Final office Action for U.S. Appl. No. 16/172,253, dated Feb. 12, 2020.
Office Action for Germany Patent Application No. 102017214941.8 dated Jan. 31, 2020.

(56) References Cited

OTHER PUBLICATIONS

Bochner, B., "Digitization in the Mobile Home—Mobile tour into the digital future," URL: https://www.promobil.de/zubehoer/mobil-tour-in die-digi-zukunft digitale kofortzone.
Heinz, D.S., "Bus Technology in the Camper—promobil explains the complex electronics," URL: https://www.promobil.de/werkstatt/elektronik-im-wohnmobil-bus-technik-und-apps.
DE Application No. 112018005002.5 filed Apr. 24, 2020 entitled "Systems, Methods, and Apparatuses for Providing Communications Between Climate Control Devices in a Recreational Vehicle".
Non Final office Action for U.S. Appl. No. 16/172,253, dated May 20, 2020.
European Patent Office, International Search Report and Written Opinion for PCT/EP2018/070390 dated Sep. 12, 2018, 10 pages.
U.S. Appl. No. 18/245,320 titled "A Recreational Vehicle User Interface" filed Mar. 14, 2023.
AU Application No. 2021343247 titled "A Recreational Vehicle User Interface" filed on Mar. 13, 2023.
U.S. Appl. No. 18/245,321 titled "System and Method for Controlling at Least One Function of a Recreational Vehicle" filed Mar. 14, 2023.
U.S. Appl. No. 18/245,322 titled "Devices and Methods for Securing Communication Between a Sensor and a Device" filed Mar. 14, 2023.
PCT Application No. PCT/EP2022/068965 titled "Minibar Communication" filed on Jul. 7, 2022.
International Search Report and Written Opinion issued in PCT Application No. PCT/EP2022/068965 dated Feb. 21, 2023.
PCT Application No. PCT/EP2022/068968 titled "Minibar Operation" filed on Jul. 7, 2022.
International Search Report and Written Opinion issued in PCT Application No. PCT/EP2022/068968 dated Feb. 20, 2023.
PCT Application No. PCT/EP2022/068970 titled "Initialisation of a Communication Device for a Minibar" filed on Jul. 7, 2022.
International Search Report and Written Opinion issued in PCT Application No. PCT/EP2022/068970 dated Feb. 1, 2023.
International Search Report and Written Opinion issued in PCT Application No. PCT/EP2022/056369 dated Nov. 9, 2022.
Corrected Notice of Allowance Issued in U.S. Appl. No. 16/641,581 dated Jan. 14, 2022.
International Search Report Issued in PCT Application No. PCT/EP2021/075391 dated Nov. 9, 2021.
International Search Report Issued in PCT Application No. PCT/EP2021/075390 dated Dec. 20, 2021.
International Search Report Issued in PCT Application No. PCT/EP2021/075389 dated Jan. 18, 2022.
Non Final office Action Issued in U.S. Appl. No. 16/641,581, dated Jun. 18, 2021.
Notice of Allowance for U.S. Appl. No. 16/641,581 dated Oct. 6, 2021.
PCT Application No. PCT/EP2022/056369 titled "Improved Use of Minibar Sensors" filed on Mar. 11, 2022.
European Patent Application No. 20197019.1 entitled "A Recreational Vehicle User Interface" filed on Sep. 18, 2020.
European Patent Application No. 20197022.5 entitled "System and Method for Controlling at least one Function of a Vehicle" filed on Sep. 18, 2020.
European Patent Application No. 20197023.3 entitled "Devices and Method for Controlling at least one Function of a Vehicle" filed on Sep. 18, 2020.
Extended European Search Report for European Patent Application No. 20197019.1 dated Mar. 9, 2021.
Extended European Search Report for European Patent Application No. 20197022.5 dated Mar. 4, 2021.
Extended European Search Report for European Patent Application No. 20197023.3 dated Feb. 16, 2021.
"Understanding : On/Off, Floating, Modulating/Proportional Control", retrieved from internet URL: https://controltrends.org/by-industry/commercial-hvac/03/understanding-on-off-floating-modulatingproportional-control/, on Jan. 23, 2019, pp. 2, paragraph 3.
"Starting up the Truma iNet System," truma iNet System, pp. 1-8 (2015).
Ferrill, B., et al., "Swipe to Patent: Design Patents in the Age of User Interfaces," Tech Crunch, retreived from Internet URL: https://techcrunch.com/2015/08/03/swipe-to-patent-design-patents-in-the-age-of-user-interfaces/, on Dec. 12, 2018, pp. 23.
"STIIC—Smart Touch Integrated Intelligence Control," retreived from internet URL: https://citimarinestore.com/en/dometic-marine-air-conditioner-parts/4748-stiic-smart-touch-integrated-intelligence-control-263400309.html on Dec. 12, 2018, pp. 3.
International Search Report and Written Opinion for International Application No. PCT/IB2018/058414, dated Jan. 31, 2019.
U.S. Appl. No. 62/578,350, filed Oct. 27, 2017 entitled "Systems, Methods, and Apparatuses for Providing Communications Between Climate Control Devices in a Recreational Vehicle".
Office Action for Germany Patent Application No. 102017214941.8 dated Nov. 2, 2023.
Office Action issued in EP Application No. 20197023.3 dated Oct. 24, 2023.

\* cited by examiner

RECREATIONAL VEHICLE, COOLING DEVICE, CONTROLLING SYSTEM AND METHOD FOR CONTROLLING THE COOLING DEVICE

CLAIM TO PRIORITY

This continuation patent application claims priority to and benefit of, under 35 U.S.C. § 120, U.S. patent application Ser. No. 16/641,581, filed Feb. 24, 2020, which claims priority to PCT Patent Application Serial Number PCT/EP/2018/070390, filed Jul. 17, 2018, and DE Patent Application Serial Number 102017214941.8, filed Aug. 25, 2017, all of which is incorporated by reference herein.

BACKGROUND

1. Field of the Invention

The present embodiments refer to caravans or recreational vehicles, a cooling device for a caravans or recreational vehicles, a controlling system for such caravans or recreational vehicles and/or cooling device and methods for controlling the cooling device.

2. Description of the Related Art

Today, a plurality of electronic devices are provided in caravans or recreational vehicles, in the following defined as RV, to increase the functionality of the RV and thus to make a ride with the RV as pleasant as possible. Such electronic devices are for example an air conditioning system, a lighting system, various cooking devices and in particular cooling devices as refrigerators and, preferably, absorption refrigerators, the latter being preferred due to its low energy consumption and noise generation. However, conventionally, these electronic devices of an RV are provided and controlled independently from each other. This shows the drawback, that each of the electronic devices of an RV has to be equipped with its own sensors and logic units to determine and process data required to choose the best operation mode for the respective device. This results in a huge increase in the costs for each of the provided electronic devices. Furthermore, frequently it arises, that at least some of the provided electronic devices require the same data, as for example an ambient temperature, to optimize their operation mode. Thus, as each of the devices has its own sensors and logic unit for determining and processing these date, the costs for the overall entirety of the provided electronic devices is increased substantially due to multiple provided sensors and logic unit for determining and processing the same data. Further, each of the electronic devices only has access to the data generated by its own, which limits the available functionality of each of the provided devices substantially. Finally, controlling all of the different electronic devices of the RV is cumbersome for the user.

Accordingly, it is the task of the present embodiments to provide a RV, a cooling device for RV's and/or a controlling system for RV's overcoming the above described drawbacks and thus decreasing the costs for the RV and the entirety of the therein provided electronic devices while increasing the functionality of the caravan and the therein provided devices.

This task is solved by the RV, the cooling device for RV's, the controlling system for RV's and/or the method according to independent claims 1, 14, 15 and 16. Advantages on embodiments thereof are disclosed in the dependent claims.

SUMMARY

According to some embodiments, a controlling system configured to be installed in a caravan or recreational vehicle (RV) comprises a central possessing unit, a read out unit and a controlling unit. The controlling system is configured to be coupled to a plurality of electronic devices and/or sensors of the RV. The read out unit is configured to read out data from the electronic devices and/or sensors of the RV coupled to the controlling system and to forward the read out data to the central possessing unit. The central processing unit is configured to receive and to process the read out data received from the read out unit and to forward the processed data to the controlling unit. The controlling unit is configured to receive the processed data from the central processing unit and to control at least one of the electronic devices coupled to the controlling system based on at least some of the processed data.

Caravan or recreational vehicle (RV) in the sense of the present embodiments should be understood in its broadest interpretation including, besides others, campers and mobile homes. Reading out in the sense of the present embodiments not only means to actively obtain data but also to passively receive data. The received data also can be instructions and/or commands. The plurality of electronic devices can for example comprise an air conditioning system of the RV, a lighting system thereof, provided cooking devices as well as computers and or mobile devices like mobile phones and tablets. Furthermore, also additionally provided sensors like motion detectors, photo sensors, tilting sensors and temperature sensors can serve as electronic devices in the sense of the present embodiments. Sensors of the RV are basically sensors provided in the RV as part of the electronic controlling unit of the RV or at least coupled thereto. Examples for such sensors are a tachometer, a sensor for determining the filling of the fuel and/or gas tank of the RV, a battery sensor and or temperatures sensors of the RV. Processing in the sense of the present embodiments should be understood not just as customizing data but also as analyzing data and or generating new data from the data. However, processing also can mean keeping the data in the read out configuration without customizing them.

In other words, the controlling system according to the present embodiments collects data from electronic devices coupled thereto and analyses and/or processes the collected data centrally. Finally, the controlling system utilizes the analyzed data and/or the processed data to control at least one of the electronic devices coupled to the controlling system. Thus, it is possible, to use data determined by one or more of the electronic devices coupled to the controlling system for determining an optimized operation mode for the at least one of the electronic devices and to forward instructions to the at least one of the electronic devices in order to operate this device according to the determined optimized operation mode. Thus, it is for example possible to optimize the operation mode of a refrigerator provided in the RV based on ambient temperature data obtained from an air conditioning system and/or a temperature sensor of the RV itself. Accordingly, the refrigerator does not have to be provided with its own ambient temperature sensor. In sum, having such a central controlling system allows optimizing the overall system of the RV and of the plurality of electronic devices in view of highly decreased costs thereof, as no sensor has to be provided several times in the respective electronic devices, and/or RV. Furthermore, it is possible to use data, which until now due to cost and effort expenditure was not used, to optimize the operation mode of some of the electronic devices to optimize its operation mode. For example, while until now the operation mode of a cooling device was not optimized based on a weather forecast, because such a configuration would be complex and expensive, using the controlling system enables this optimizing based on a weather forecast easily, when, for example, the controlling system is coupled to the internet and configured to read out and analyze data with regard to weather forecast. This results, besides the highly-decreased costs for the overall system, in a highly-increased functionality of the overall system of the RV and its electronic devices.

Altogether, the above disclosed controlling system provides huge possibilities for optimizing overall systems of a RV and electronic devices in view of highly decreased costs for such systems and highly increased functionality thereof.

Advantageously, the controlling system further comprises a memory unit. The memory unit is configured to store information defining how to control the at least one of the electronic devices based on the read out data. The central processing unit further is configured to read out the stored information from the memory unit and to use this information to process the read out data. In doing so, it is possible to influence the processing of the read out data reliably and, thus, to optimize the processing of the read out data and, thus, in the end the controlling of the at least one of the electronic devices freely. For example, the stored information can be some user profiles and/or various selectable operation modes defining the operation of the controlling system due to specific requirements, which has to be considered when processing and controlling the at least one of the electronic devices. For example, via the stored information it can be defined, that when operating the air conditioning system at maximum cooling power, the refrigerator has to be operated at an energy saving operation mode to reduce the overall energy consumption of the overall system comprising the air conditioning system and the refrigerator.

Advantageously, the central processing unit further may be configured to generate and to process data. Such data, in particular, can be time related data. Therewith it is possible to increase the functionality of the controlling system substantially. Besides, the costs for the overall system can be reduced as specific data is generated by the processing unit and does not have to be determined via additionally provided sensors. One example for such self-generated data is time related data like a real clock time and or relative times as used for timers.

In some embodiments, the processed data can be derived from the user's behavior. The behavior of the users is relatively similar over time in a RV, e.g. breakfast and/or dinner are usually taken the same time every day or showering is also done mostly at the same time, for instance in the morning. Thus, based on the read out data from the electronic devices and/or the sensors, the central processing unit can evaluate the users' behavior which in turn can again be used to further optimize the operation mode and to reduce the overall energy consumption.

Advantageously, the controlling system comprises or is coupled to a display unit. The central processing unit further is configured to forward at least a part of the processed data to the display unit, while the display unit is configured to receive and display the part of the processed data. This configuration allows to display a specific selection of the processed data to a user and thus assists the user in deciding for specific settings and/or commands for controlling the controlling system. Thus, for example, a charge level of various energy storages of the RV, like the gas tank or the automotive battery, can be displayed via the display to support the user in deciding which energy source should be used to supply the at least one of the electronic devices with energy, and/or whether and when it is necessary to refill at least one of the provided energy storages.

Advantageously, the controlling system, may be configured to be coupled to electronic devices via wireless data connection, and in particular to receive and process commands from the electronic devices coupled to the controlling system as read out data. Examples for such wireless data connections are local and or global radio network connections, Bluetooth connections, infrared connections and or near range communication connections. Thus, it is possible to provide a communication between the controlling system and electronic devices without the necessity of providing an often unattractive and confusing cable based connection. This results, next to increased flexibility, in decreased costs and decreased required space for the controlling system as not for each of the electronic devices coupled to the controlling system an independent connection port has to be provided.

Advantageously, the entirety of the electronic devices may comprise an electric control unit of the RV, mobile and/or stationary equipment of the RV, other controlling systems and or BUS-systems provided in the RV, additionally provided sensors, and/or external mobile devices. By coupling the controlling system to at least one of these exemplary electronic devices, the controlling system is able to obtain data determined by the respective electronic devices and to use this data to control at least one of the electronic devices. Thus, the functionality of the controlling system is further increased. For example, data with regard to the operation mode of the motor of the RV obtained via the electric control unit of the RV can be used to optimize the operation mode of a refrigerator provided in the RV by, for example, operating the refrigerator at a high-power level via the automotive battery of the RV when the motor of the RV is in operation and, thus, enough energy is provided in the automotive battery of the RV.

Advantageously, the processing unit of the controlling system may be sourced out at least partially to one or more of the electronic devices coupled to the controlling system. Thus, the controlling system can resort to the processing power of the one or more of the electronic devices coupled to the controlling system. Therewith, it is possible to increase the effective processing power of the controlling system substantially and/or to decrease the costs for the controlling system by decreasing the processing power of the controlling system itself while keeping up and/or even increasing the effective processing power for the controlling system.

Advantageously, the read out unit may be coupled to the internet and configured to read out data from the internet automatically when coupled thereto. In this configuration, the controlling system has access to the almost infinite information from the internet, which results in a huge increase in the accessible functionality of the controlling system. For example, the controlling system can obtain information with regard to the real clock time and/or weather forecast from the internet and use this information to control a cooling device provided in the RV and coupled to the controlling system as defined by a user and/or in an optimized manner with regard to cooling efficiency.

In addition, the external information can also be used to inform the user about expected power limitations based on the current settings of the controlling system. For instance, in case the weather forecast predicts rather high ambient temperatures during daytime, the user can be informed that more energy might be needed for cooling purposes. Preferably, the controlling system gives ideas for improvement to the user in case power limitations are expected. Thus, the user can directly alter the settings based on the suggestions of the controlling system, e.g. chose a different energy source for one of the electronic devices or completely shut down one of the electronic devices temporarily. Preferably, the settings of the controlling system are changed in case the user confirms the suggestion. Thus, this greatly enhances ease of use and allows to reduce the overall energy consumption.

Advantageously, the controlling system may be coupled to various energy storages of the RV provided to supply energy to the at least one electronic device, and configured to control, which one of the provided energy storages is used to supply energy to the at least one electronic device. This configuration enables an optimization of the energy consumption of the overall system and of the utilization of the provided energy storages. For example, when the RV is coupled to a socket for external energy supply on a camping ground, the controlling system can be able to guarantee that a provided cooling device is supplied with energy from the socket and not with energy provided by gas burner supplied with gas from a gas tank of the RV.

Advantageously, the controlling system provides various operation modes selectable by a user for controlling the at least one electronic device in a specific manner. Examples for such operation modes are an energy saving mode, in which the at least one electronic device is operated in view of a minimum energy consumption, a high-power mode, in which the at least one electronic device is operated without attention on the energy consumption at its highest available cooling power, and/or a silent mode, in which the at least one electronic device is operated as silent as possible. The respective controlling parameters for the various operation modes can be for example stored in a memory unit coupled to the controlling system and/or can be read out respectively received from one of the electronic devices, like for example a mobile phone or a tablet coupled to the controlling system wirelessly. At least some of the provided operation modes can contain information for controlling respectively operation various of the electronic devices. This allows a fast and reliably controlling of the controlling system and thus of the at least one of the electronic devices coupled to the controlling system.

Advantageously, the at least one of the electronic devices is a cooling device for RV's and/or a device configured to define and/or control an operation mode of the cooling device. In particular, such a cooling device can be a refrigerator, and more specifically, for example, an absorption refrigerator due to its low energy consumption and low noise generation. Thus, by the controlling system, it is possible to optimize the operation mode of the cooling device based on a huge variety of data obtained from various electronic devices coupled to the controlling system without the need of providing sensors in the cooling device configured to determine each of these data. Accordingly, this configuration results in decreased costs for the cooling device and, thus, of the overall system of the RV and the electronic devices coupled to the controlling system while, at the same time, in a substantial increase of the functionality of the cooling device.

Further advantageously, the controlling system is configured to control the operation mode of the cooling device based on a huge variety of data. For example, the operation mode of the cooling device can be controllable by the controlling system based on a real clock time, such as for example during night times the cooling device is operated in a silent mode and/or an energy saving mode. Usually, during night time, the required energy for cooling the internal space of the cooling device is less than during day time due to lower ambient temperatures. In contrast to this, during day time the cooling device can be operated in a high-performance mode to ensure a sufficient cooling of the cooling space of the cooling device.

Furthermore, during night time the cooling device can be operated in a defrosting mode. Usually, during night time, the cooling device will not heat up as much during defrosting than during day time due to the lower ambient temperature. Above that, the operation mode of the cooling device can be controlled based on a relative time, such as for example in the course of a boost mode, in which for a specific time frame, the cooling power of the cooling device is maximized to intercept an expected temperature decrease within the cooling space of the cooling device, for example occurring after shopping and filling in the warm goods from the shopping bag into the cooling space. Additionally and/or alternatively thereto, the operation mode of the cooling device can also be controllable based on a global location of the RV. In doing so, it is for example possible to select the allowed energy source for providing the cooling device with energy automatically, as for example on ferry boats, it is when the caravan or RV is located, globally seen, on an expanse of water like a lake, the cooling device is not allowed to be provided with energy from the gas tank due to safety technical regulations. Thus, to comply with the safety regulations, when the controlling system determines, that the caravan is on a lake, it can ensure, that the cooling device is only provided with energy from the automotive battery.

Alternatively, the controlling system can determine via the global location of the RV the specific climate zone in which the RV remains and then can optimize the operation mode of the cooling device based on the therewith supposed temperature and/or humidity. Furthermore, the operation mode of the cooling device can be controllable by the controlling system based on operation information of the RV. Thus, for example, when the controlling system recognizes from the operation information of the RV that the RV is driving, the cooling device usually has not to be operated in a frequently less energy efficient silent mode due to the high driving noise, and thus switch the operation mode of the cooling device from a silent mode, for example, to an energy saving mode automatically.

Besides, the controlling system could choose to operate the cooling device with energy supplied by the automotive battery of the RV as during the RV is motor-driven as then the automotive battery is recharged automatically. According to another example, the operation mode of the cooling device can be controllable by the controlling system in view of tilting information for the RV and/or of the cooling device. Thus, for example the controlling system is able to initiate an emergency shutdown of the cooling device when the tilting of the RV and/or of the cooling device exceeds a predetermined critical value, to prevent danger emanating from a cooling device tilted over during operation.

Besides, the controlling system can be configured to control the operation mode of the cooling device based on an internal and/or ambient temperature of the cooling device and/or the RV. This allows to operate the cooling device in an optimized operation mode selected not only dependent on the internal or ambient temperature of the cooling device but also dependent from the ambient temperature of the RV and, thus, of the outdoor temperature. The controlling system can also be configured to control the operation mode of the cooling device based on operation information of the cooling device itself. In other words, at least a part of a central processing unit of the cooling device can be outsourced to the controlling system to reduce the costs of the cooling device.

Furthermore, the current weather situation or a weather forecast can be determined by the controlling system and can be used by the controlling system to control the operation mode of the cooling device. For example, the controlling system can operate the cooling device in a high-power mode when extreme hot weather is forecast to ensure a sufficient cooling of the cooling space of the cooling device while, In case of a cold outside condition with decreased or low outside temperature, the cooling device can be controlled by the controlling system to operate in an energy saving mode. Alternatively and/or in additionally, the controlling system can be configured to control the operation mode of the cooling device based on a charging level and/or the availability of various energy storages and/or sources. In this configuration, the controlling system is able to optimize a utilization of various energy sources and storages coupled to the controlling system. For example, when a photovoltaic system of the RV provides enough energy for operating a cooling device, not gas from a gas tank has to be used to provide the required energy for operating the cooling device, and/or the cooling device is operated in an energy saving mode, then the charging level of each of the available energy sources is below 10%.

Furthermore, the controlling system can be configured to control the operation mode of the cooling device based on a sound level of the cooling device and/or a sound level within the RV. In view of this, the controlling system can be able to decide when it is necessary to operate the cooling device, for example, in a silent mode, which is, for example, not the case when the sound level within the RV already is at a high level. Another example for data based on which the controlling system can be configured to control the operation mode of the cooling device is the energy consumption of the cooling device. Thus, for example, when the controlling system determines that the energy consumption of the cooling device is too high, the controlling system can instruct the cooling device to execute a defrosting cycle to restore an optimized cooling efficiency of the cooling device.

Finally, the controlling system can also be configured to control the operation mode of the controlling device based on specific operation instructions programmed to the central processing unit, stored in a memory coupled to the central processing unit and/or received via or read out from one or more of the electronic devices coupled to the controlling system. These configurations enable various possibilities to modify and optimize the controlling of the operation mode of the cooling device by the controlling system in view of various technical necessities and/or requests of a user. Thus, for example, the user is able to instruct the controlling system how to control the operation mode of the cooling device regardless of other programmed instructions and thus to satisfy the user's expectations towards the controlling system and/or the operation of the provided cooling device.

Further advantageously, the controlling system is configured to control an operation mode of a heater and/or of a compressor of the cooling device. These two options are the most common and effective ways of controlling an operation mode of a cooling device and thus provide an easy as well as reliable and efficient controlling of the operation mode of the provided cooling device of the RV.

A cooling device for a caravan or recreational vehicle (RV) according to the present embodiments comprises or is coupled to a controlling system according to anyone of the above described configurations. The cooling device in particular can be a refrigerator and more specifically, for example, an absorption refrigerator, as in particular an absorption refrigerator has proven itself to be very advantageous to be used in RVs due to its low generation of noise and energy consumption. This configuration allows to reduce the overall costs of the cooling device while increasing its functionality and efficiency substantially, dependent on other devices coupled to the controlling system.

A caravan or recreational vehicle (RV) according to the present embodiments comprises any one of the above described controlling systems and/or a cooling device as described before. This allows to transfer the above set forth advantages, in particular in view of reduced costs and increased efficiency and functionality to the RV.

Finally, according to the present embodiments, a method for controlling an operation mode of a cooling device for a caravan or recreational vehicle (RV), in particular a refrigerator and more specifically, for example, an absorption refrigerator, comprises the following steps. First, data and/or instructions are read out and/or received from electronic devices and sensors of the RV. In a next step, the read out data is processed. Finally, at least a part of the processed data is used to control the operation mode of the cooling device. This method allows to use a huge variety of data determined by various electronic devices and/or sensors of the RV to identify a best mode of operation for the cooling device and to control the cooling device in accordance with the identified best mode of operation. Therefore, it is possible to reduce the costs for the cooling device as the cooling device itself not has to be provided with sensors for each of the data required to determine the best mode of operation for the cooling device. Above that, the operation of the cooling device can be optimized substantially, as an immense plurality of data can be used to optimize the operation mode of the cooling device without the necessity of increasing the costs for the cooling device substantially.

Advantageously, controlling the operation mode of the cooling device is based on various data as it already has been explained above with reference to the controlling system. For example, controlling the operation mode of the cooling device is based on data with regard to the real clock time, a relative time, a global location of the RV, operation information of the RV, tilting information of the RV and/or of the cooling device, an internal and/or ambient temperature of the cooling device and/or of the RV, operation information of the cooling device itself, a current weather situation and/or weather forecast, a charging level and/or availability of various energy storages and/or sources, a sound level of the cooling device and/or within the RV, a current energy consumption of the cooling device, and/or specific operation instructions programmed to the central processing unit, stored in a memory coupled to the central processing unit and/or received from and/or red out from one or more of the electronic devices. Exemplary advantages for the above set forth distinct data used to control the operation mode of the cooling device already have been described above, which is why for the sake of brevity they are not repeated here.

BRIEF DESCRIPTION OF THE DRAWINGS

In the following, embodiments will be described to substantiate the understanding of the above said with reference to the drawings, wherein in FIG. 1 a caravan or recreational vehicle (RV), a cooling device and a controlling system according to exemplary embodiments are illustrated.

DETAILED DESCRIPTION

Figure 1:
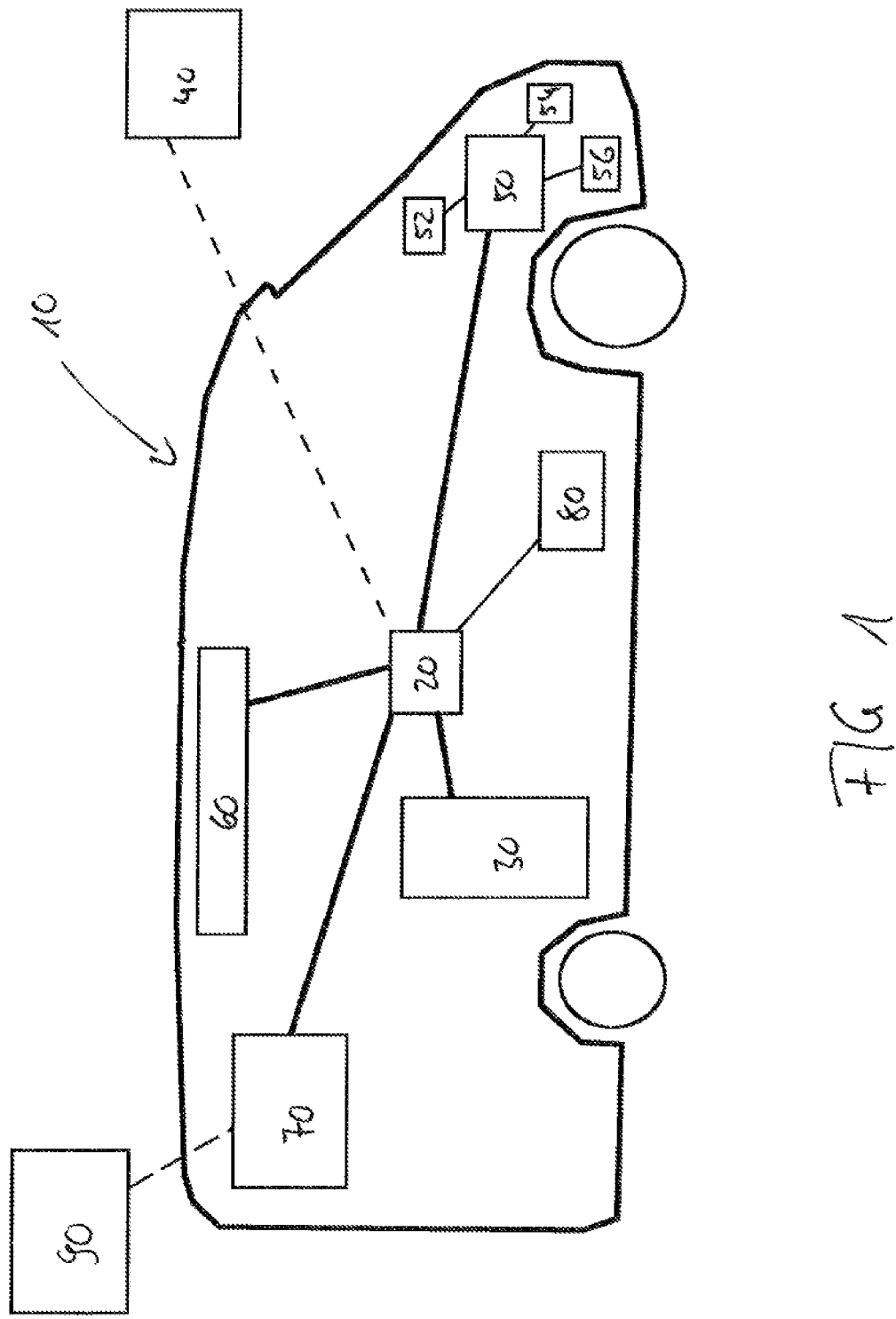

As illustrated in FIG. 1, the caravan or recreational vehicle (RV) 10 comprises a controlling system 20. The controlling system 20 is coupled to several electronic devices 30, 40, 50, 60, 70 and 80. In the depicted example, electronic device 30 is a cooling device in the form of an absorption refrigerator, electronic device 40 is a mobile device in the form of a mobile phone, electronic device 50 is the electronic control unit of the RV, electronic device 60 is an air conditioning system of the RV, electronic device 70 is a router which is configured to communicate with the internet 90 and electronic device 80 is an additionally provided motion sensor monitoring movements within the RV. As indicated by the continuous lines, in the present embodiment the controlling system 20 is coupled to the electronic devices 30, 50, 60, 70 and 80 via hard wires, while the controlling system 20 is coupled to the mobile phone 40 via a wireless data connection in the form of a Bluetooth connection. However, also another distribution of the kinds of connections or other methods of coupling are imaginable without departing from the scope of the present embodiments.

The electronic control unit 50 of the caravan 10 is further coupled via hard wires to some sensors 52, 54 and 56 of the RV 10, and, thus, provides a coupling between the sensors 52, 54, 56 and the controlling system 20. In the depicted example, the first sensor 52 is a speed sensor for determining the travel speed of the RV 10, the second sensor 54 is a temperature sensor for determining the ambient temperature of the RV 10 and the third sensor 56 is a charge level sensor for determining the charge level of the automotive battery of the RV 10. However, more or less and/or other sensors are imaginable.

Figure 6:
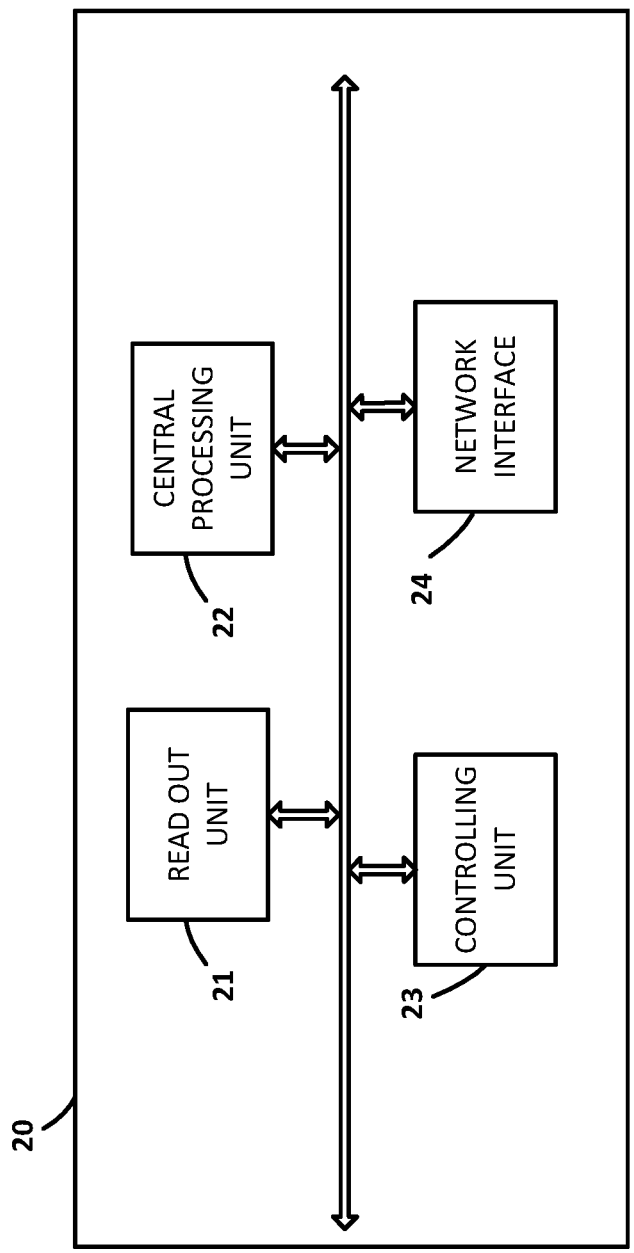
FIG. 6 depicts the controlling system of FIG. 1.

The controlling system 20 comprises (e.g., as shown in FIG. 6) a read out unit 21, which is configured to read out and receive data from the electronic devices 30, 40, 60, 70 and 80 and from the sensors 52, 54 and 56 of the RV 10. Furthermore, the controlling system 20 comprises a central processing unit 22 and a controlling unit 23. The central processing unit 22 is configured to receive and process the said read out respectively received data, which is forwarded from the read out unit 21 to the central processing unit 22. The central processing unit 22 further comprises an internal clock to generate information with regard to at least a relative time. The controlling unit 23 of the controlling system 20 is configured to receive processed data forwarded from the central processing unit 22 to the controlling unit 23, and to control the absorption refrigerator 30 based on at least some of the processed data received from the central processing unit 22. The controlling system 20 is further configured to communicate via the router 70 with the internet and to obtain information therefrom. In the illustrated example, the controlling system 20 is able to obtain real clock time information and weather forecast information for the current position of the RV 10 from the internet 90. Furthermore, the controlling system 20 is configured to communicate with the mobile phone 40 to transmit data to the mobile phone 40 and/or to receive data from the mobile phone 40 via a network interface 24 of the controlling system 20. Hence, status and other relevant information dedicated to the user can be displayed by the mobile phone 40. Further, the user can input instructions into the mobile phone 40 to control the electronic devices 30, 40, 60, 70 and 80 via the network interface 24 of the controlling system 20.

Figure 2A:
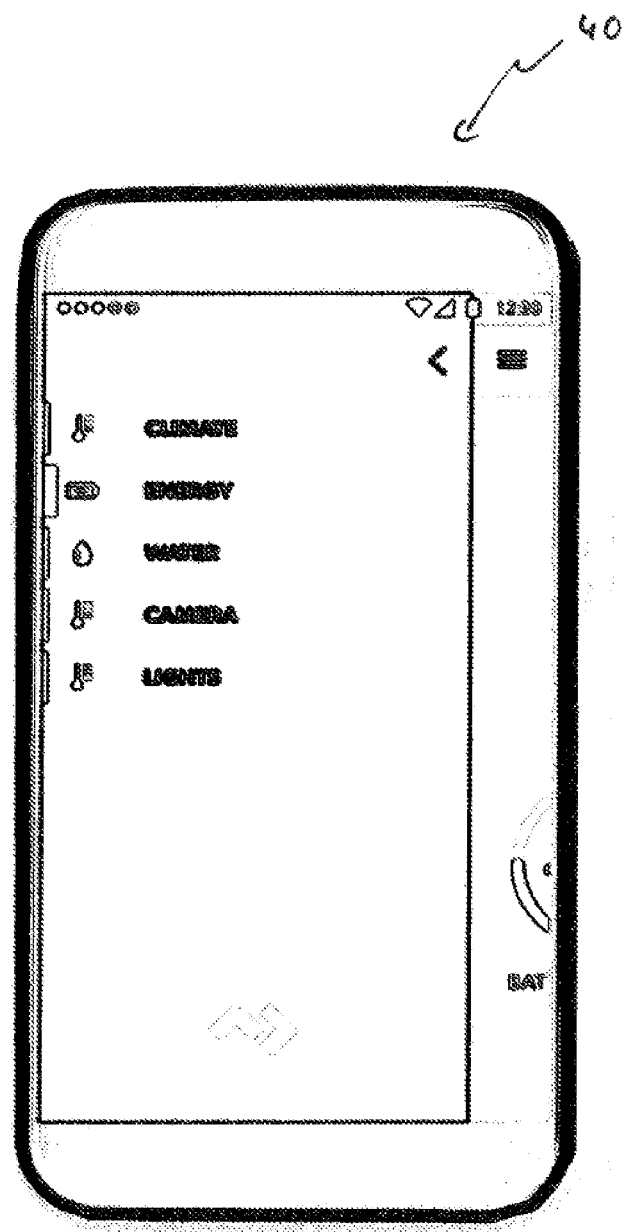
FIGS. 2A to 2C several control modes of an exemplary embodiment of an electronical device configured to be coupled to the controlling system and/or cooling device shown in FIG. 1 and being configured to provide the controlling system with several instructions for controlling the other electronic devices coupled to the controlling system and to display processed date received from the controlling system is illustrated.
Figure 2B:
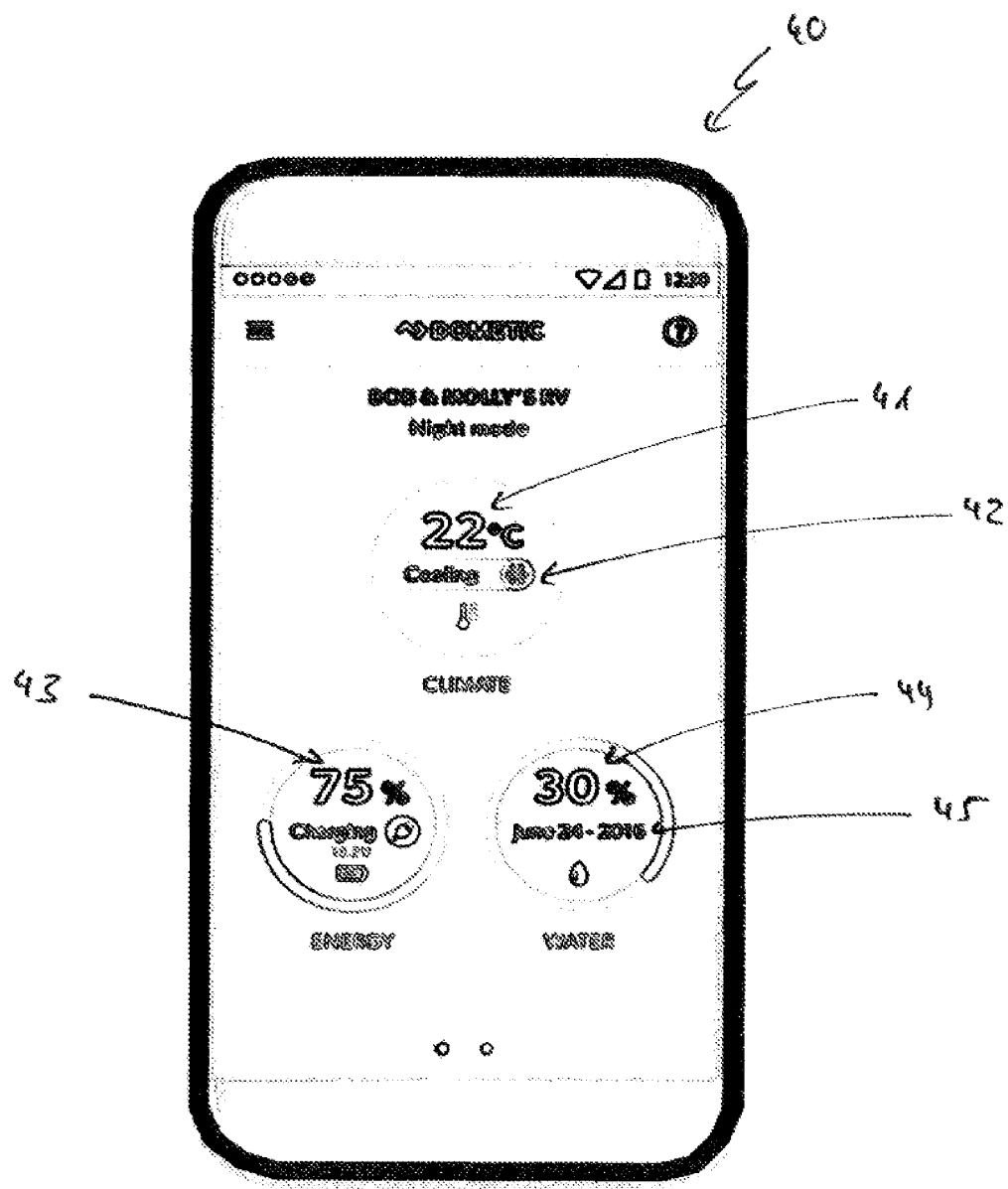
Figure 2C:
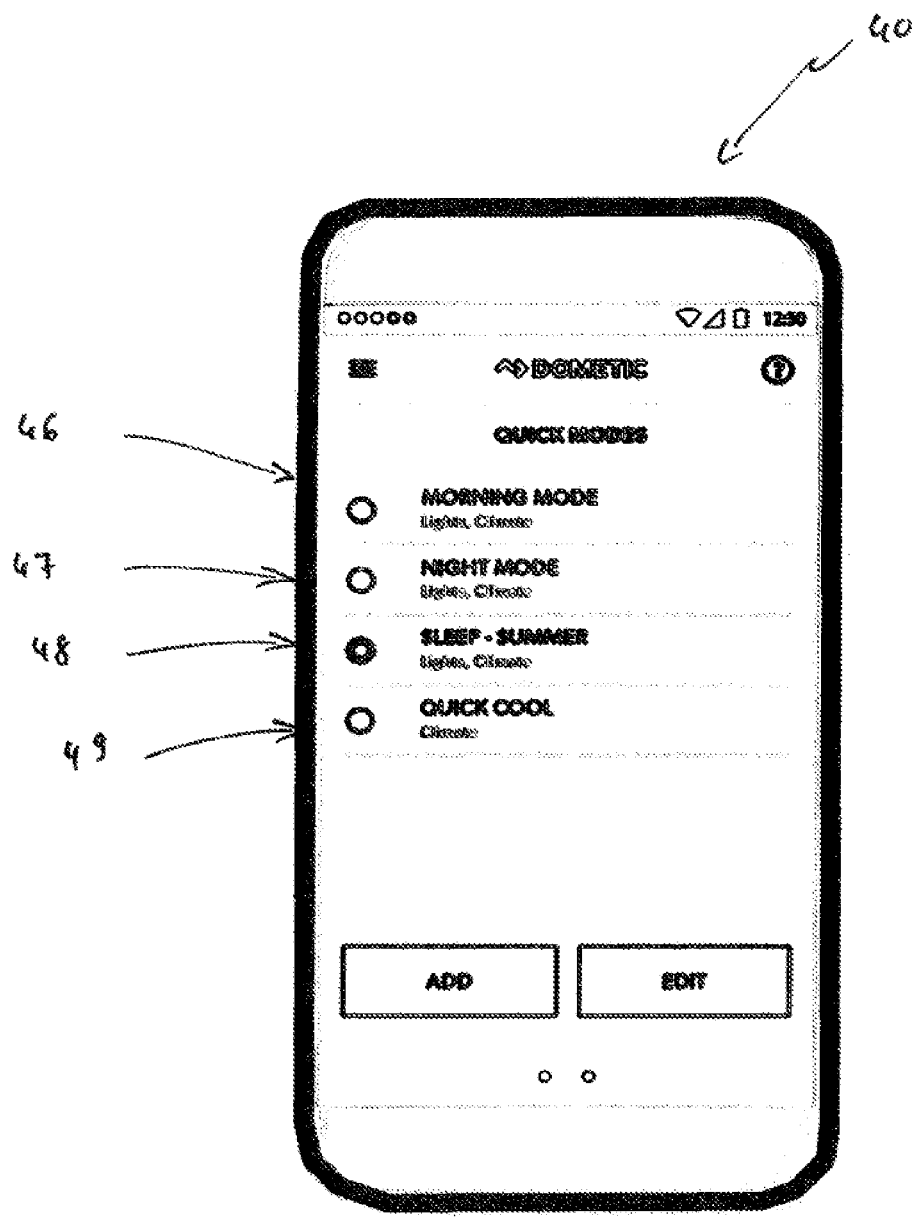

As indicated in FIGS. 2A to 2C the mobile phone 40 is configured to display data received from the controlling unit 50 and to receive as well as to forward instructions for operating the controlling system 20 to the controlling system 20. In the depicted embodiment, the mobile phone 40 is configured to display information and to forward instructions with regard to the climate of the RV 10, the energy supply of the RV 10, a water storage of the RV 10, a camera system of the RV 10 as well as the lighting system provided in the RV 10. Thus, additional electronic devices than the above described, in particular with regard to climate, energy, water, camera and or lights of the RV 10 can be coupled the controlling system 20 and controlled by the mobile phone 40 via the controlling system 20. However, for the sake of brevity and clarity, these further electronic devices are not illustrated in FIG. 1.

In FIG. 2B, there are illustrated examples for information which can be obtained by the controlling system 20 and, after transmitting the same to the mobile phone 40, displayed by the mobile phone 40 to the user. Besides others, the controlling system 20 and the mobile phone 40 are configured to determine and display data with regard to the temperature 41 within the RV 10, the operation mode 42 of the air conditioning system 60, the charging level 43 of the automotive battery 56 of the RV 10, the filling level 44 of a water tank of the RV and the date 45 of the previous exchange of the water of the fresh water tank of the RV 10. Furthermore, the mobile phone 40 is able to display information that currently the mobile phone 40 is successfully connected to the controlling system 20 of a specific RV 10 of "Bob and Molly" and information about the mode the controlling system 20 is currently operated, here in the "night mode". Besides this information of course a huge variety of other information can be displayed by the mobile phone 40 dependent on the choice of electronic devices and sensors of the RV 10 coupled to the controlling system 20. The user may select and individualize the variety of information to be displayed within the software or application used on the mobile phone 40.

Finally, in FIG. 2C it is depicted, that via the mobile phone 40 a user select an operation mode to operate the controlling system 20. In the depicted example, there are four predefined operation modes available being a morning mode 46, a night mode 47, a sleep-summer mode 48 and a quick cool mode 49. Via the mobile phone 40, the user can edit the provided predefined modes and/or can add further modes being individualized to his need as well as choose a specific mode as operation mode for the controlling system. Thus, the user can freely control the operation of the controlling system 20 and, thus, indirectly the distinct operation mode for operating the at least one of the provided electronic devices 30, 40, 60, 70, and 80. Here, the depicted predefined modes basically refer to operation modes of the air conditioning system 60 of the RV 10 and a lighting system provided in the RV 10. Other devices coupled to the controlling system 20 as, for example, the refrigerator 30 can be operated based on the information of a provided predefined mode. By the predefined modes, a user is able to control the operation mode of the controlling system 20 with regard to a plurality of electronic devices 30, 40, 60, 70, and 80 coupled to the controlling system 20 simultaneously, thus, achieving a huge facilitation in controlling all the provided electronic devices 30, 40, 60, 70 and 80.

Figure 3:
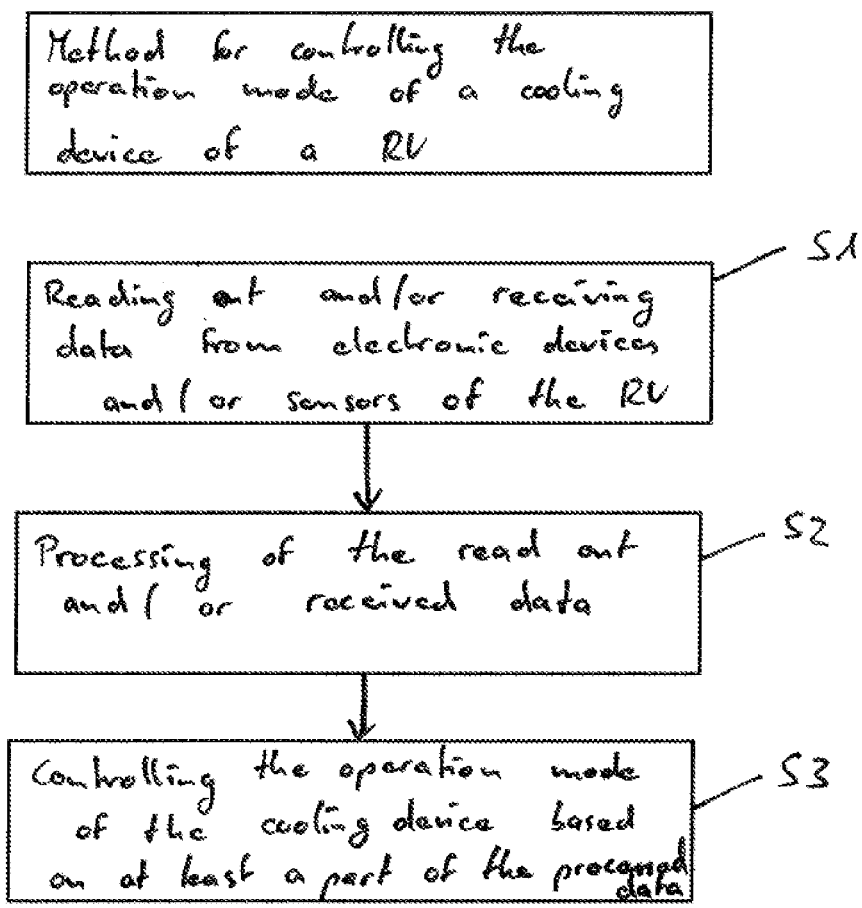
FIG. 3 an exemplary method for controlling a cooling device for RV's according to an advantageous embodiment is visualized.

In FIG. 3, a method for controlling an operation mode of a cooling device 30 of the RV 10 according to the present embodiments is depicted. It is noted that the controlling system 20 disclosed above is able to at least carry out the steps of this method. In a first step S1, various data are read out respectively received from electronic devices 30, 40, 60, 70, and 80 and/or sensors 52, 54 and 56 of the RV 10. In the next step S2, the read out and/or received data is processed. Finally, in a third step S3, at least a part of the processed data is used to control the operation mode of the cooling device 30 in an optimized matter.

In the following, to underline the advantages and potential of the present embodiments, examples for controlling the operation mode of the cooling device 30 advantageously will be described.

Figure 4B:
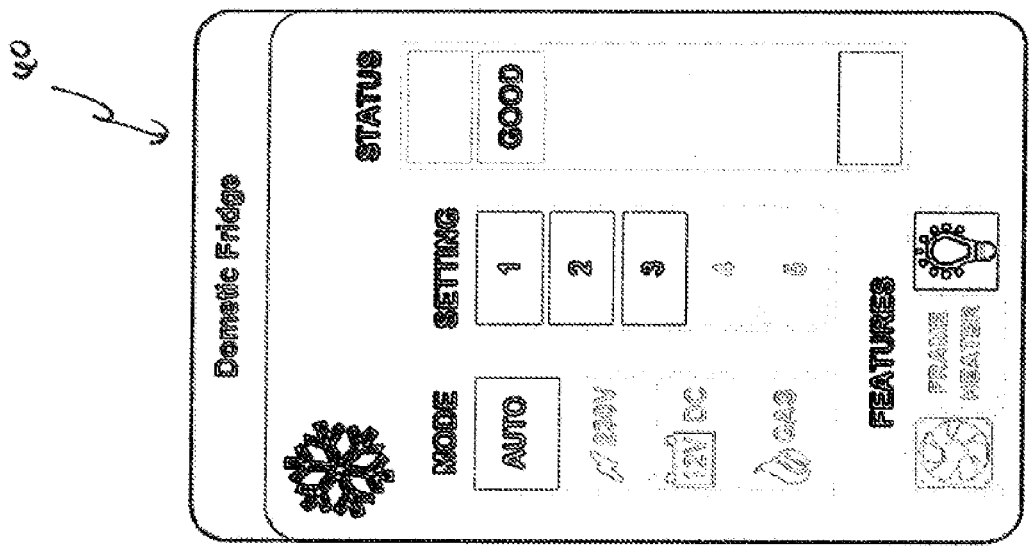
FIGS. 4A and 4B two control modes of another exemplary embodiment of an electronic device configured to be coupled to the controlling system and/or cooling device shown in FIG. 1 and being configured to provide the controlling system with several instructions for controlling the other electronic devices coupled to the controlling system and to display processed date received from the controlling system is illustrated.
Figure 4A:
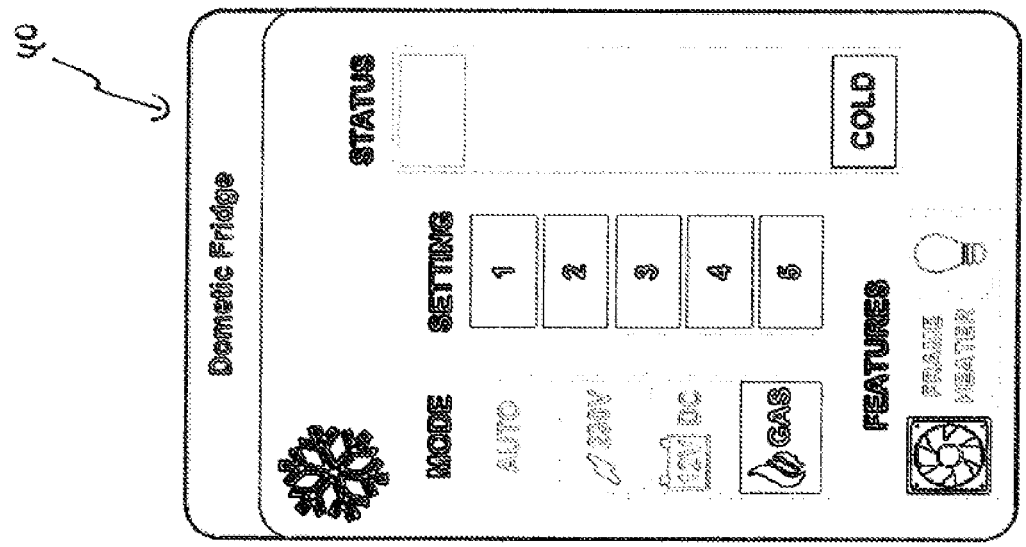

As illustrated in FIGS. 4A and 4B the controlling system 20 is able to select the energy source used to operate the cooling device 30. The selection can be performed automatically and or manually via a mobile device 40 coupled to the controlling system 20. Furthermore, it is possible to select one or more of a list of various settings to define the operation mode of the cooling device 30. For example, the various settings indicate, that the cooling device 30 is controlled based on specific data as already described above, and again will be described in the following. Above that, the controlling system 20 can be able to determine and display a status of the cooling device 30 via the mobile device 40.

Figure 5:
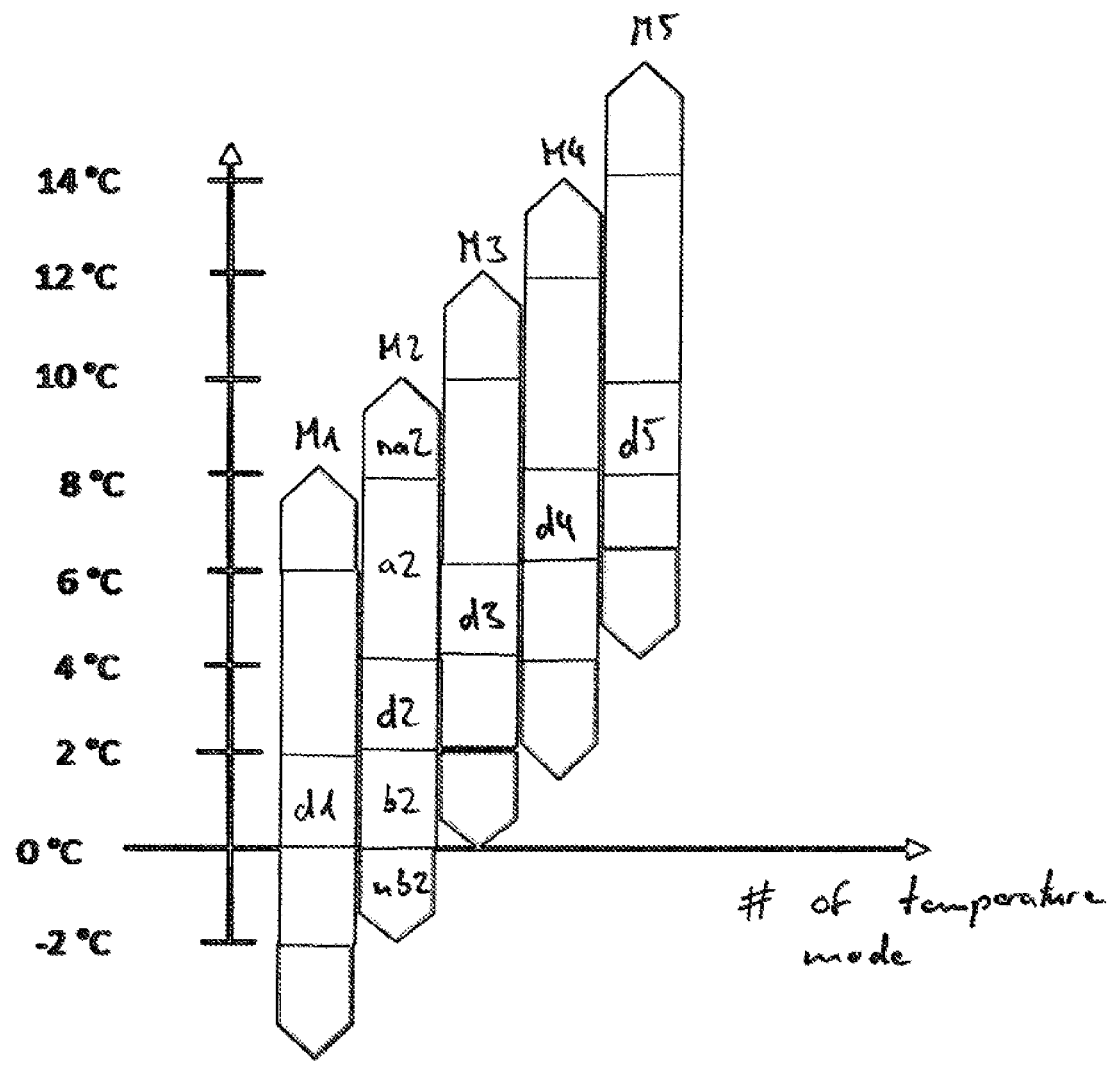
FIG. 5 an explicit operation mode of the exemplary controlling system of FIG. 1 is depicted.

An example for a correlation between read out data and displayed data is depicted in the diagram of FIG. 5. This diagram also is an example for information defining how to control the at least one of the electronic devices 30, 40, 60, 70 and 80 and which information is displayed based on the read out data. Here, five various temperature modes M1 to M5 are defined by several temperature ranges d1 to d5 within which the internal temperature of the cooling device 30 should be. According to the first mode M1, for example, the internal temperature of the cooling device 30 should be between 0° C. and 2° C., according to the second mode M2 the internal temperature of the cooling device 30 should be between 2° C. and 4° C., according to the third mode M3 the internal temperature of the cooling device 30 should be between 4° C. and 6° C., according to the forth mode M4 the temperature within the cooling device 30 should be between 6° C. and 8° C., and according to the fifth mode M5 the temperature within the cooling device 30 should be between 8° C. and 10° C. For each of the five modes M1 to M5, there is defined a specific area surrounding the desired temperature range indicating temperatures outside the desired temperature range. Temperatures within these areas are still acceptable. This acceptable temperature range is predefined for every mode M1 to M5 from 2° below the lower limit of the relevant temperature range d1 to d5 to the lower limit of the depicted temperature range d1 to d5, and from the upper limit of the relevant temperature range d1 to d5 up to 4° above the upper limit of the relevant temperature range d1 to d5. Outside the relevant temperature range d1 to d5 and outside the acceptable temperature range for the specific operation mode M1 to M5, the temperature within the cooling device 30 is not acceptable. For example, when the temperature within the cooling device 30 is within the desired temperature range d2 during operation in mode M2, the cooling device 30 is operated in an energy saving mode. As soon as the temperature exceeds the desired temperature range but still is within the acceptable temperature range a2 above the desired temperature range d2, the cooling device 30 can be operated in a normal operation mode to cool down the cooling space towards the desired temperature range d2. If the temperature within the cooling device 30 even exceeds the acceptable temperature a2 above the desired temperature range d2, the cooling device 30 is operated in a high-performance mode to cool down the inner of the cooling device 30 as soon as possible at least until an acceptable temperature range is reached. In the present example, this high-performance mode lasts until an acceptable temperature range b2 below the desired temperature range d2 is reached. Thus, it is prevented that the temperature within the cooling device 30 just oscillates between the upper acceptable temperature range a2 and an upper not acceptable temperature range na2, which would have the effect that the desired temperature range d2 is never reached. On the other hand, when the temperature within the cooling device 30 falls below the desired temperature range d2 to the lower acceptable temperature range b2, the controlling system 20 is configured to operate the cooling device 30 in a defrosting operation mode to defrost the cooling device to recover the cooling device. If the temperature within the cooling device 30 even falls below the lower acceptable temperature range b2, the controlling system 20 is configured to switch off the cooling device 30 to initiate a fast temperature increase in the cooling device 30 towards to the desired temperature range d2. The above set forth with regard do mode M2 can easily be transferred to the other modes M1 and M3 to M5. Besides the above-described functionality, also various other advantages possibilities are imaginable without leaving the scope of the present embodiments.

Again, returning to FIGS. 4A and 4B depicting the mobile device 40, there are still some further features which can be controlled by the controlling system 20 and displayed by the display unit of the mobile device 40. For example, the cooling device 30 can comprise a fan which is activated when the temperature within the cooling device 30 falls below the lower acceptable temperature range, to blow warm air into the interior of the cooling device 30 for accelerating the desired heating up within the cooling device 30. Furthermore, the controlling system 20 is configured to control a frame heater of the cooling device 30 for defrosting the cooling device 30. Finally, the controlling system 20 is configured to monitor the status of the door of the cooling device 30 being closed or open. For example, this can be achieved by controlling the status of an interior illumination device positioned within the cooling device 30, specifically, whether illumination is on or off. The mobile device 40 is configured to display the obtained information with regard to the operation modes of the fan, the frame heater, and the illumination as depicted in FIGS. 4A and 4B.

In the following, some other advantageous functions of the depicted controlling system 20 will be described.

The depicted controlling system 20 is configured to control the operation mode of the cooling device 30 based on a real clock time. The real clock time can be obtained automatically via the router from the internet 90. When it is not possible to get the information with regard to the real clock time from the internet 90, the controlling system 20 is configured to obtain the real clock time information from the mobile phone 40 coupled to the controlling system 20. The controlling system 20 uses the obtained data with regard to the real clock time to control the operation mode of the cooling device 30, for example, by activating an operation of the cooling device 30 by a specific time set. For example, the operation mode can be switched on every day at 8 a.m. and switched off at 8 p.m. on the same day. Thus, the cooling device 30 is operated during day time only and, thus, energy consumption during night time is reduced significantly. Furthermore, the controlling system 20 according to the present embodiment is configured to initiate a boosted cooling operation of the cooling device 30, for example, during noon and to execute a defrosting cycle at midnight. Thus, unintended temperature increases during noon due to high ambient temperatures can be avoided while the defrosting cycle is executed when no considerable temperature increase has to be feared as it would be during noon. In particular, the operation mode of the controlling system 20 and thus the operation mode of controlling the electronic devices 30, 40, 60, 70 and 80 is adapted to a user's behavior pattern stored in a memory coupled to the controlling system 20 as well as an additionally provided user behavior control system comprising at least a movement sensor coupled to the controlling system 20.

Furthermore, the controlling system 20 is configured to control the operation mode of the cooling device 30 based on a relative time which is generated by the processing unit of the controlling system 20. For example, when the user activates a boost mode for the cooling device 30 via the mobile phone 40 coupled to the controlling system 20, for example for a duration of 45 minutes, starting with receiving the instruction to perform the boost mode, the cooling system 30 is operated at a high-performance mode without considering the energy consumption. Such a boost mode, for example, can be activated before the user intends to go for shopping such that, a temperature increase due to the new items placed within the cooling device 30 after shopping is quenched.

Furthermore, the controlling system 20 is configured to control the operation mode of the cooling device 30 based on a global location of the RV obtained by the mobile phone 40 and/or via the router 70 from the internet 90. For example, the controlling system 20 recognizes when the RV 10 is at home and, by recognizing this home position, switches off the cooling device 30 of the RV 10.

Furthermore, the controlling system 20 is configured to control the operation mode of the cooling device 30 based on operation information of the RV 10 by selecting the energy source for supplying the cooling device 30 based on the driving mode of the RV. Thus, when the RV 10 is motor-driven, the cooling device 30 is provided with energy from the automotive battery, while when the RV 10 is in a parked condition, the cooling device 30 is supplied with energy gained from the gas or fuel tank.

Furthermore, the controlling system 20 is configured to control the operation mode of the cooling device 30 based on an internal temperature and ambient temperature of the cooling device 30 and of the RV 10. For example, when the ambient temperature of the RV 10 is high while the internal temperature of the RV 10 is relatively low, the controlling system 30 is operated with an increased cooling power to provide a reliable cooling of the cooling space.

Furthermore, the controlling system 20 is configured to control the operation mode of the cooling device 30 based on tilting information for the RV 10 and, thus, for the cooling device 30. In particular, when the RV 10 and, thus, also the cooling device 30 is tilted above a critical predefined value, the cooling device 30 is automatically shutdown to prevent damages thereto and/or danger emanating from undesired effects when the cooling device 30 is tilted over while being operated.

Furthermore, the controlling system 20 is configured to control the operation mode of the cooling device 30 based on operation information of the cooling device 30 itself. In particular, when the controlling systems 20 determines that the cooling efficiency of the cooling device 30 drops, it controls the cooling device 30 to operate a defrosting cycle to restore the desired cooling efficiency.

Furthermore, the controlling system 20 is configured to control the operation mode of the cooling device 30 based on the current weather situation or the weather forecast for the current location of the RV 10. In particular, when the ambient temperature is high but soon strong rainfall or another temperature drop is expected according to the forecast, the cooling device 30 is not operated at its high-performance mode, because soon a drop in the ambient temperature is expected. Thus, the cooling device 30 is operated at a higher energy efficiency.

Furthermore, the controlling system 20 is configured to control the operation mode of the cooling device 30 based on a sound level of the cooling device 30 and the sound level within the RV 10. In particular, when the sound level of the cooling device 30 is high compared to the overall sound level within the RV 10, the cooling device 30 is controlled to operate in a silent mode by reducing the fan speed. Thus, users staying inside within the RV 10 are not acoustically disturbed by the operation of the cooling device 30, especially during night times.

The controlling system 20 further is configured to control the operation of the cooling device 30 based on the charging level and availability of various energy storages and sources. Exemplary energy sources are on-board systems like an automotive battery of the RV 10 or an internal gas tank and external electrical power supply, for example provided on a camping ground or at home, as indicated in FIGS. 4A and 4B. In particular, when the controlling system 20 recognizes that an external energy supply is coupled to the RV 10 and is available, the cooling device 30 is operated with the energy from the external energy supply, but not with the energy from the on-board systems. This helps significantly to preserve the energy stored in the on-board systems.

Furthermore, the controlling system 20 is configured to control the operation mode of the cooling device 30 based on a determined energy consumption of the cooling device 30. In particular, when the energy consumption of the cooling device 30 is above an acceptable value, a defrosting operation is executed such that the desired cooling efficiency of the cooling device 30 is restored.

Furthermore, the controlling system 20 is configured to control the operation mode of the cooling device 30 based on further specific operation instructions programmed to the central processing unit, stored in a memory coupled to the central processing unit of the controlling system 20 and received via the mobile phone 40 or read out from the internet 90 via the router 70. In particular, each command received from the mobile phone 40 and, thus, intended by a user will be carried out by the controlling system 20 regardless of other programmed or stored information. This ensures that the controlling system 20 controls the cooling device 30 as it is desired by the user.

It is obviously, that the controlling system 20 has to be coupled to corresponding electrical devices providing the data required to control the operation mode of the cooling device 30 in the above-described advantages manners.

REFERENCE SIGNS

- 10: recreational vehicle
- 20: controlling system
- 30: cooling device
- 40: mobile device
- 41: internal temperature
- 42: operation mode of air-con
- 43: charging level of automotive battery
- 44: filling level of water tank
- 45: last date of exchanging water of the water tank
- 46: morning mode
- 47: night mode
- 48: sleep-summer mode
- 49: quick cool mode
- 50: electronic control unit
- 52: speed sensor
- 54: temperature sensor
- 56: charging level sensor
- 60: air con
- 70: router
- 80: movement sensor
- 90: internet
- S1 to S3: method steps
- M1 to M5: temperature modes
- d1 to d5: desired temperature ranges
- a2: acceptable temperature range above desired temperature range d2
- b2: acceptable temperature range below desired temperature range d2
- na2: non-acceptable temperature range above desired temperature range d2
- nb2: non-acceptable temperature range below desired temperature range d2

The invention claimed is:

1. A method implemented by one or more processors, the method comprising:
   receiving data from a plurality of electronic devices of a caravan or recreational vehicle, wherein the received data indicates a corresponding individual operation mode of each of the plurality of electronic devices of the caravan or recreational vehicle, and wherein each of the plurality of electronic devices of the caravan or recreational vehicle operate utilizing a given energy storage of the caravan or recreational vehicle;
   receiving a user selection, from a user of the caravan or recreational vehicle, of a given global operation mode, from among a plurality of global operation modes, for the plurality of electronic devices of the caravan or recreational vehicle;
   generating, based on the received data and based on the user selection of the given global operation mode, processed data for the plurality of electronic devices of the caravan or recreational vehicle, wherein the processed data indicates a corresponding modified individual operation mode for at least a refrigerator of the caravan or recreational vehicle, and the refrigerator being one of the plurality of electronic devices of the caravan or recreational vehicle; and
   causing the refrigerator of the caravan or recreational vehicle to be controlled based on the corresponding modified individual operation mode for the refrigerator.

2. The method of claim 1, wherein the processed data further indicates an additional corresponding modified individual operation mode for at least one additional electronic device, of the plurality of electronic devices, of the caravan or recreational vehicle, and wherein the at least one additional electronic device of the caravan or recreational vehicle is in addition to the refrigerator of the caravan or recreational vehicle.

3. The method of claim 2, wherein generating the processed data that indicates the corresponding modified individual operation mode for the refrigerator of the caravan or recreational vehicle is further based on the additional corresponding modified individual operation mode for the at least one additional electronic device of the caravan or recreational vehicle.

4. The method of claim 3, wherein generating the processed data that indicates the corresponding modified individual operation mode for the refrigerator of the caravan or recreational vehicle based on the additional corresponding modified individual operation mode for the at least one additional electronic device of the caravan or recreational vehicle is based on energy consumption of the given energy storage of the caravan or recreational vehicle by the at least one additional electronic device of the caravan or recreational vehicle operating in the additional corresponding modified individual operation mode.

5. The method of claim 1, wherein generating the processed data that indicates the corresponding modified individual operation mode for the refrigerator of the caravan or recreational vehicle is further based on a state of charge or availability of the given energy storage of the caravan or recreational vehicle.

6. The method of claim 1, wherein generating the processed data for the plurality of electronic devices of the caravan or recreational vehicle is further based on one or more of: a real clock time, a relative clock time, a global location of the caravan or recreational vehicle, operation information of the caravan or recreational vehicle, tilting information for the caravan or recreational vehicle, an internal or ambient temperature of the caravan or recreational vehicle or the caravan or recreational vehicle, operation information of the refrigerator of the caravan or recreational vehicle, a current weather forecast, or a sound level of the refrigerator or within the caravan or recreational vehicle.

7. The method of claim 1, wherein the one or more processors are local to a controlling system of the caravan or recreational vehicle that is external from the refrigerator.

8. The method of claim 7, wherein the controlling system of the caravan or recreational vehicle is communicatively coupled to the plurality of electronic devices via a wireless data connection, and wherein the received data is received from the plurality of electronic devices via the wireless data connection.

9. The method of claim 7, wherein the controlling system of the refrigerator of the caravan or recreational vehicle is communicatively coupled to the plurality of electronic devices via a wireless data connection, and wherein the received data is received from the plurality of electronic devices via the wireless data connection.

10. The method of claim 1, wherein the one or more processors are local to a controlling system of the refrigerator of the caravan or recreational vehicle that is local to the refrigerator.

11. The method of claim 1, wherein the plurality of global operation modes comprises two or more of: a morning mode, a night mode, a sleep-summer mode, a quick cool mode, a high power mode, a silent mode, or an energy saving mode.

12. The method of claim 1, wherein the plurality of electronic devices further include one or more of: a lighting system of the caravan or recreational vehicle, one or more cooking devices of the caravan or recreational vehicle, a water system of the caravan or recreational vehicle, or an air conditioning system of the caravan or recreational vehicle.

13. A method implemented by one or more processors, the method comprising:
receiving data from a computing device associated with a caravan or recreational vehicle, wherein the received data indicates a corresponding location of the caravan or recreational vehicle, wherein the caravan or recreational vehicle includes a plurality of electronic devices that operate utilizing a given energy storage of the caravan or recreational vehicle, and wherein the plurality of electronic devices include a refrigerator of the caravan or recreational vehicle and at least one additional electronic device of the caravan or recreational vehicle;
determining, based on the corresponding location of the caravan or recreational vehicle, whether the refrigerator can operate utilizing the given energy storage of the caravan or recreational vehicle; and
in response to determining that the refrigerator cannot operate utilizing the given energy storage of the caravan or the recreational vehicle based on the corresponding location of the caravan or recreational vehicle:
identifying an alternate energy storage of the caravan or recreational vehicle with which the refrigerator can operate based on the corresponding location of the caravan or recreational vehicle; and
causing at least the refrigerator of the caravan or recreational vehicle to switch from operating utilizing the given energy storage of the caravan or recreational vehicle to operating utilizing the alternate energy storage of the caravan or recreational vehicle.

14. The method of claim 13, wherein determining whether the refrigerator can operate utilizing the given energy storage of the caravan or recreational vehicle based on the corresponding location of the caravan or recreational vehicle comprises:
determining, based on the corresponding location of the caravan or recreational vehicle, that the caravan or recreational vehicle is located in a particular geographical area; and
determining that the refrigerator cannot operate utilizing the given energy storage of the caravan or the recreational vehicle based on the particular geographical area.

15. The method of claim 14, wherein determining that the refrigerator cannot operate utilizing the given energy storage of the caravan or the recreational vehicle based on the particular geographical area comprises determining that safety regulations for the particular geographical area indicate that the refrigerator cannot operate utilizing the given energy storage of the caravan or the recreational vehicle within the particular geographical area.

16. The method of claim 14, wherein the particular geographical area corresponds to an expanse of water.

17. The method of claim 13, wherein the given energy storage of the caravan or the recreational vehicle corresponds to a gas tank of the caravan or recreational vehicle, and wherein the alternate energy storage of the recreational vehicle corresponds to an automotive battery of the caravan or recreational vehicle.

18. A controlling system configured to be installed in a caravan or recreational vehicle, comprising:
a central processing unit; and
memory storing instructions that, when executed, cause the central processing unit to perform operations, the operations comprising:
receiving data from a plurality of electronic devices of the caravan or recreational vehicle, wherein the received data indicates a corresponding individual operation mode of each of the plurality of electronic devices of the caravan or recreational vehicle, and wherein each of the plurality of electronic devices of the caravan or recreational vehicle operate utilizing a given energy storage of the caravan or recreational vehicle;
receiving a user selection, from a user of the caravan or recreational vehicle, of a given global operation mode, from among a plurality of global operation modes, for the plurality of electronic devices of the caravan or recreational vehicle;
generating, based on the received data and based on the user selection of the given global operation mode, processed data for the plurality of electronic devices of the caravan or recreational vehicle, wherein the processed data indicates a corresponding modified individual operation mode for at least a refrigerator of the caravan or recreational vehicle, and the refrigerator being one of the plurality of electronic devices of the caravan or recreational vehicle; and
causing the refrigerator of the caravan or recreational vehicle to be controlled based on the corresponding modified individual operation mode for the refrigerator.

19. The controlling system of claim 18, wherein the controlling system is installed in the caravan or recreational vehicle and is external from the refrigerator.

20. The controlling system of claim 18, wherein the controlling system is installed in the caravan or recreational vehicle and is local from the refrigerator.

\* \* \* \* \*